United States Patent
Flora et al.

(10) Patent No.: US 11,395,984 B2
(45) Date of Patent: Jul. 26, 2022

(54) DUST CONTROL SYSTEM AND RELATED METHODS

(71) Applicant: FLORY INDUSTRIES, Salida, CA (US)

(72) Inventors: Michael Flora, Modesto, CA (US); Brandon Eller, Ripon, CA (US); Clinton Grover, Modesto, CA (US)

( * ) Notice: Subject to any disclaimer, the term of this patent is extended or adjusted under 35 U.S.C. 154(b) by 0 days.

(21) Appl. No.: 16/883,791

(22) Filed: May 26, 2020

(65) Prior Publication Data

US 2020/0368659 A1    Nov. 26, 2020

Related U.S. Application Data

(60) Provisional application No. 62/852,926, filed on May 24, 2019.

(51) Int. Cl.
| | | |
|---|---|---|
| *B01D 50/00* | (2022.01) | |
| *B01D 45/12* | (2006.01) | |
| *A01F 12/48* | (2006.01) | |
| *A01F 12/44* | (2006.01) | |
| *B01D 46/10* | (2006.01) | |
| *B01D 50/20* | (2022.01) | |

(Continued)

(52) U.S. Cl.
CPC ............ *B01D 45/12* (2013.01); *A01F 12/442* (2013.01); *A01F 12/48* (2013.01); *B01D 46/10* (2013.01); *B01D 50/20* (2022.01); *A01D 33/08* (2013.01); *A01D 51/002* (2013.01)

(58) Field of Classification Search
CPC ...... B01D 45/12; B01D 50/002; B01D 46/10; A01F 12/48; A01F 12/442; A01D 33/08; A01D 51/002
See application file for complete search history.

(56) References Cited

U.S. PATENT DOCUMENTS

| | | |
|---|---|---|
| 1,275,299 A | 8/1918 | Pellerin |
| 1,562,946 A | 11/1925 | Dowdall |

(Continued)

FOREIGN PATENT DOCUMENTS

| | | |
|---|---|---|
| CN | 201664563 U | 12/2010 |
| EP | 0737030 B1 | 10/1996 |

(Continued)

OTHER PUBLICATIONS

English machine translation of abstract of CN201664563U retrieved on Aug. 2, 2018 from "https://patents.google.com/patent/CN201664563U/en?oq=CN201664563U".

(Continued)

*Primary Examiner* — Dung H Bui
(74) *Attorney, Agent, or Firm* — Sierra IP Law, PC; William K. Nelson

(57) ABSTRACT

The present invention provides an improved dust control system for removing debris and particulate matter from a fouled air stream. The system may be incorporated into crop harvesting equipment to eliminate the dust pollution generated by conventional harvesting equipment. The dust control system may use a multi-stage air filtering process that employs inertial separation techniques to eliminate particulate matter from the fouled air, without the need for water or electrostatic mechanisms to capture the fine particulates in the fouled air.

17 Claims, 17 Drawing Sheets

(51) Int. Cl.
 *A01D 33/08* (2006.01)
 *A01D 51/00* (2006.01)

(56) References Cited

U.S. PATENT DOCUMENTS

| | | | |
|---|---|---|---|
| 2,027,906 A | 1/1935 | Hand | |
| 2,294,086 A | 8/1942 | Hinds et al. | |
| 2,496,281 A | 2/1950 | Fisher | |
| 2,587,289 A | 2/1952 | Cook | |
| 2,604,068 A | 7/1952 | Dolbey | |
| 2,661,810 A | 12/1953 | Heth | |
| 2,664,580 A | 1/1954 | Feeser | |
| 2,721,656 A | 10/1955 | Goodwin | |
| 2,932,360 A | 4/1960 | Hungate | |
| 3,227,276 A | 1/1966 | Leighton et al. | |
| 3,351,200 A | 11/1967 | Burenga | |
| 3,520,114 A | 7/1970 | Pall et al. | |
| 3,619,997 A * | 11/1971 | Wood | A01D 90/105 56/14.6 |
| 3,626,677 A | 12/1971 | Sides | |
| 3,630,011 A | 12/1971 | Dunn | |
| 3,630,355 A | 12/1971 | Christensen | |
| 3,681,169 A | 8/1972 | Wiquel | |
| 3,698,171 A | 10/1972 | Hecht | |
| 3,713,277 A | 1/1973 | Sackett | |
| 3,714,768 A | 2/1973 | Patterson | |
| 3,778,982 A | 12/1973 | Birke | |
| 3,800,513 A | 4/1974 | Lappin | |
| 3,802,162 A | 4/1974 | Deane | |
| 3,854,585 A | 12/1974 | Herkes | |
| 3,869,266 A | 3/1975 | Rannenberg | |
| 3,895,930 A | 7/1975 | Campolong | |
| 3,915,679 A | 10/1975 | Roach et al. | |
| 3,918,940 A | 11/1975 | Westlake et al. | |
| 3,989,485 A | 11/1976 | Kilian | |
| 4,008,059 A * | 2/1977 | Monson | B01D 45/14 55/396 |
| 4,035,993 A | 7/1977 | Bell et al. | |
| 4,157,249 A | 6/1979 | Namy | |
| 4,194,346 A | 3/1980 | Ingalls | |
| 4,255,174 A | 3/1981 | Simpson | |
| 4,287,707 A | 9/1981 | Persoons et al. | |
| 4,290,820 A | 9/1981 | Swisher et al. | |
| 4,348,057 A * | 9/1982 | Parenti | E21F 5/20 299/12 |
| 4,378,976 A | 4/1983 | Rush | |
| 4,380,353 A | 4/1983 | Campbell et al. | |
| 4,439,218 A | 3/1984 | Priepke et al. | |
| 4,499,713 A | 2/1985 | Stone | |
| 4,531,784 A | 7/1985 | Karlovsky | |
| 4,572,741 A | 2/1986 | Mason | |
| 4,642,977 A | 2/1987 | Ramacher | |
| 4,753,296 A | 6/1988 | Kruithoff | |
| 4,784,755 A | 11/1988 | Taylor | |
| 4,787,920 A | 11/1988 | Richard | |
| 4,810,268 A | 3/1989 | Chambers et al. | |
| 4,846,856 A | 7/1989 | Burger et al. | |
| 4,869,737 A * | 9/1989 | Parenti | B01D 46/46 96/400 |
| 4,877,431 A | 10/1989 | Avondoglio | |
| 4,985,058 A | 1/1991 | Prinsloo et al. | |
| 4,997,549 A | 3/1991 | Atwood | |
| 5,001,893 A | 3/1991 | Stanley et al. | |
| 5,024,278 A | 6/1991 | Shuknecht | |
| 5,113,643 A | 5/1992 | Peterson et al. | |
| 5,300,131 A | 4/1994 | Richard | |
| 5,373,688 A | 12/1994 | Stanley et al. | |
| 5,376,046 A | 12/1994 | Shuknecht et al. | |
| 5,421,147 A | 6/1995 | Holden et al. | |
| 5,683,476 A | 11/1997 | Divers | |
| RE35,917 E | 10/1998 | Fischer et al. | |
| 6,277,176 B1 | 8/2001 | Tang et al. | |
| 6,312,504 B1 | 11/2001 | Both et al. | |
| 6,348,086 B1 | 2/2002 | Harms et al. | |
| 6,558,252 B2 | 5/2003 | Visagie et al. | |
| 6,752,857 B1 | 6/2004 | Birdwell | |
| 6,767,007 B2 | 7/2004 | Luman | |
| 7,131,254 B2 | 11/2006 | Flora et al. | |
| 7,135,058 B1 | 11/2006 | Burkay | |
| 7,305,812 B2 | 12/2007 | Schloesser | |
| 7,322,177 B2 | 1/2008 | Geraghty | |
| 7,409,743 B2 | 8/2008 | Di Anna | |
| 7,412,817 B2 | 8/2008 | Flora et al. | |
| 7,833,303 B1 | 11/2010 | Higgins | |
| 8,347,595 B1 | 1/2013 | Flora et al. | |
| 8,651,927 B1 | 2/2014 | Roberge et al. | |
| 9,795,913 B1 | 10/2017 | Flora et al. | |
| 10,111,385 B2 | 10/2018 | DeMont et al. | |
| 2004/0003578 A1 | 1/2004 | Twiefel | |
| 2004/0020003 A1 | 2/2004 | Strauser | |
| 2004/0187449 A1 * | 9/2004 | Witter | B04C 9/00 55/337 |
| 2005/0076782 A1 | 4/2005 | Weinbren | |
| 2005/0102779 A1 | 5/2005 | Flora et al. | |
| 2005/0126396 A1 | 6/2005 | Park | |
| 2005/0274094 A1 * | 12/2005 | DeMarco | B01D 45/08 55/356 |
| 2006/0032954 A1 | 2/2006 | Lee et al. | |
| 2006/0150592 A1 | 7/2006 | Iizuka | |
| 2006/0236497 A1 | 10/2006 | Riach | |
| 2006/0283157 A1 | 12/2006 | Keys, II et al. | |
| 2007/0231885 A1 | 10/2007 | Choate et al. | |
| 2008/0047239 A1 | 2/2008 | Zheng et al. | |
| 2008/0061004 A1 | 3/2008 | Balvanz | |
| 2008/0086989 A1 * | 4/2008 | Sheidler | F02M 35/022 55/345 |
| 2009/0196806 A1 * | 8/2009 | Larnholm | B04C 5/103 422/269 |
| 2010/0267432 A1 | 10/2010 | Roberge et al. | |
| 2012/0073445 A1 | 3/2012 | Plush | |
| 2016/0138507 A1 * | 5/2016 | Klassen | F02D 41/0002 123/198 E |
| 2016/0341158 A1 * | 11/2016 | Rosenfeld | F02M 35/10013 |
| 2017/0096971 A1 * | 4/2017 | Kaufmann | B01D 45/16 |

FOREIGN PATENT DOCUMENTS

| | | |
|---|---|---|
| GB | 2382042 | 5/2003 |
| SU | 421380 | 3/1974 |
| WO | 2006066333 | 6/2006 |
| WO | 2006092702 | 9/2006 |

OTHER PUBLICATIONS

English machine translation of SU421380A1 retrieved on Jun. 23, 2021 from "https://patents.google.com/patent/SU421380A1/en?oq=SU421380".

* cited by examiner

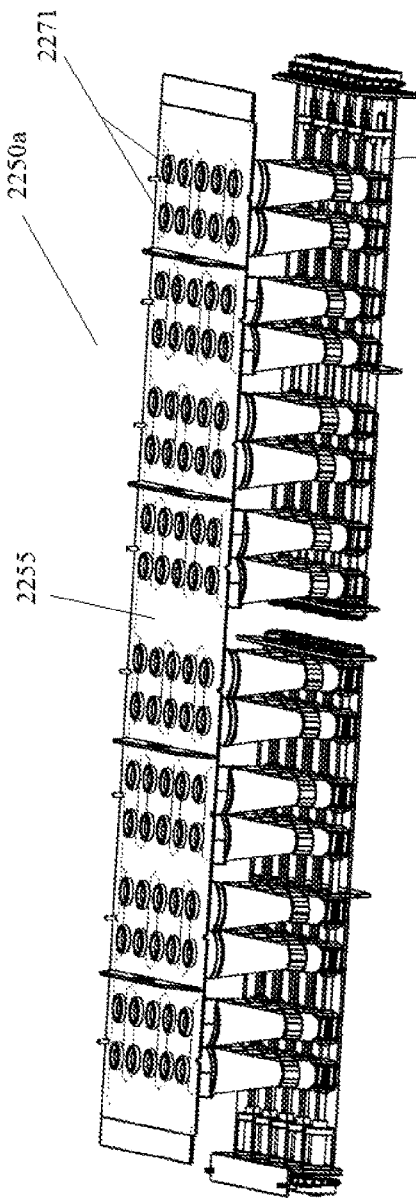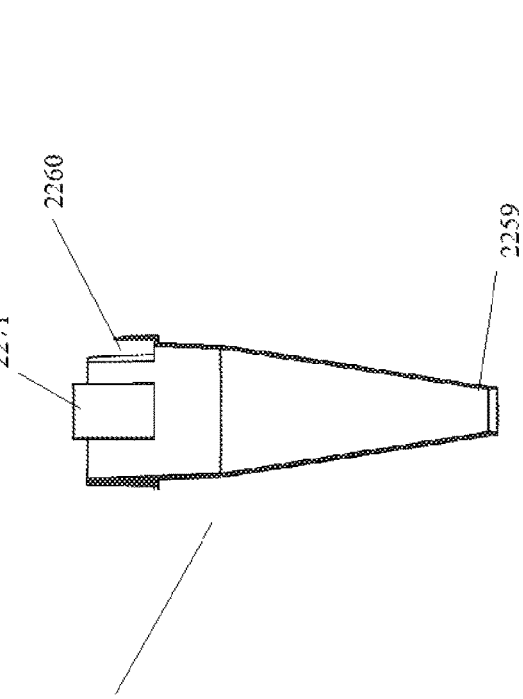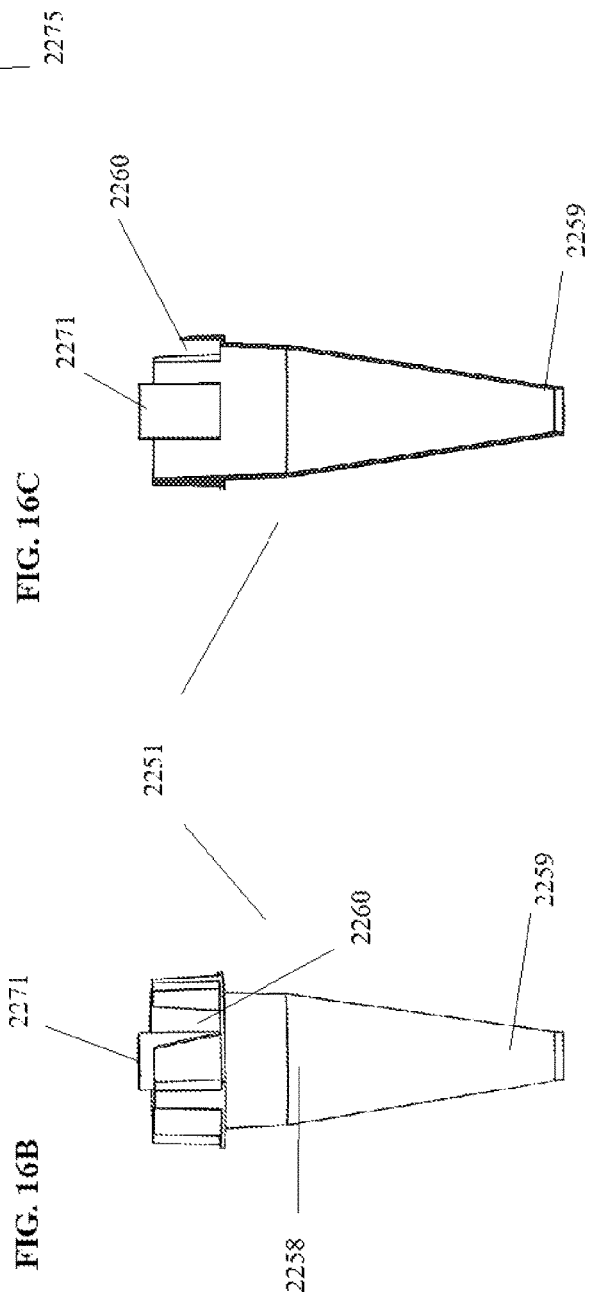
FIG. 16A
FIG. 16B
FIG. 16C

DUST CONTROL SYSTEM AND RELATED METHODS

FIELD OF THE INVENTION

The present invention relates generally to dust control systems, harvesting equipment that includes novel dust control systems, and methods of using the same. More particularly, the present invention incorporates novel multi-stage dust control devices operable to reduce or eliminate dust and particulate pollution generated by agricultural practices or other sources of such pollution.

BACKGROUND OF THE INVENTION

Harvesters and conditioners are machines that travels down orchard rows and collect windrows of fruits or nuts, and then clean them for collection. A conditioner cleans the nuts and returns them to the ground in a row for later collection. A harvester is nearly the same machine except instead of putting the nuts back onto the ground it drops the nuts into a cart for transporting to the next steps of the process. Similar processes are also used in harvesting figs and other fruits. Conditioners and harvesters accomplish the fruit or nut cleaning in two ways: by sifting/agitating the windrow (through a series of drops onto a chain comprised of rods) to allow as much dirt and organic matter smaller than the nuts to drop through the conveyor, and by the use of a suction fan that pulls air upward through the conveyor to remove leaves, grasses, dust and other light-weight materials. Harvesting equipment used in fruit and nut harvesting utilize powerful fans to separate the fruit or nuts from debris that is collected therewith. The dust mixed with the nuts and debris (including soil, leaves, twigs, etc.) collected by the conditioner or harvester is aerosolized and dispersed into the ambient air when it is discharged through the fan, generating significant amounts of particulate pollution. Conventional harvesters and conditioners generate significant amounts of dust and respirable particulate matter.

The resulting pollution can contribute to poor air quality, allergies, and other respiratory conditions, negatively impacting communities in proximity to agricultural operations using such practices. There is ongoing concern regarding the impact of the airborne particulate matter generated by such harvesting operations on air quality and human health. However, the solutions developed so far have had deficiencies and drawbacks that have precluded significant adoption of such technologies. Improved dust control systems for reducing agricultural particulate pollution are needed.

SUMMARY OF THE INVENTION

The present invention provides an improved dust suppression system, harvesters and conditioners incorporating such a system, and methods of using such a system. The dust suppression system of the present invention is a multi-stage filtering and separation system that is able to remove both coarse and fine particulate and dust material from an airstream used to draw dust and debris from a harvested crop, such as nuts, tree fruit, etc. The dust suppression system of the present invention may include multiple air filtering stages, which may include a static screen paired with one or more cleaning mechanisms for removing accumulated debris on the static screen (e.g., a wiper mechanism), one or more vortex tube separators, and/or one or more cyclonic separators. The stages of the of the dust separation system may allow for a system that is operable to remove both coarse and fine particulate matter and that does not require frequent maintenance or stoppage. Each of the separation stages is operable to discharge collected particulate matter into an airlock or other disposal system that effectively captures the particulate material, obviating the need for frequent cleaning of the system, and/or the use of water or other fluids for capturing the collected particulates. The dust suppression system of the present invention allows for harvester or conditioning machinery to run for extended periods while eliminating or significantly reducing dust and particulate material discharge.

The dust control system of the present invention may be incorporated into a conditioner, harvester, or other implement that collects nuts, fruits, or other crops from the ground, where they may be deposited by a tree-shaking harvesting method and then windrowed. The conditioner, harvester, or other implement may include a collection mechanism and a cleaning chain system for removing coarse materials from the collected crop. The collection mechanism may include brushes or other sweeping devices that direct the crop onto a conveyor or belt along with dust and debris that may be intermingled with the crop. The conveyor or belt may then deliver the crop and other materials to a cleaning chain conveyor. The cleaning chain conveyor may be a wide mesh or link chain with gaps therein that are smaller than the collected crop, but large enough to allow dust, rocks, and other debris smaller than the crop to pass through the cleaning chain to the ground. In some embodiments, there may be multiple cleaning chain conveyors, providing a staged cleaning process. The cleaning chain conveyors may also be utilized to elevate the crop up to a collection bin or chamber.

The cleaning chain conveyor may deliver the crop to an elevator conveyor for delivering the crop into the collection bin or chamber. A collection duct for the dust control system may be positioned above the cleaning chain conveyor and/or the elevator conveyor to apply a partial vacuum generated by a large, high volume fan and draw dust and debris that was not discharged through the cleaning chain(s) into a first stage of the dust control system. The fan may be located at or near the distal end of the dust control system. The fan may be operable to move about 10,000 cubic feet per minute (CFM) to about 20,000 CFM. Such rates are sufficient to remove dust and debris like leaves and twigs from a cleaning or elevator conveyor. An airstream is generated by the fan and flows through stages of the dust control system toward the fan.

The dust control system may include a first plenum that receives the air stream from a cleaning chain conveyor or elevator conveyor. The first plenum may be the proximal most structure of the dust control system, and may be substantially airtight, allowing a pressurizing member (e.g., the fan) to create a low-pressure environment that draws air and debris from the cleaning chain system into and through the dust control system. In some embodiments, the first plenum may transition from a smaller to a larger cross-sectional area, which may have the effect of slowing down the flow of the air and debris within the first plenum to facilitate settling of some of the dust and debris in the first plenum. Thus, the first plenum may also act as a settling chamber. In other embodiments, the first plenum may have a consistent or narrowing cross-section. In such embodiments, the air flow may be maintained at a higher flow rate, and the first plenum will function less as a settling chamber, allowing its size to be minimized. In such embodiments, the structures distal to the first air filtering stage will function to remove any dust and debris that passes through the first plenum without falling out of the airstream.

In some embodiments, the dust control system may include a first air filtering stage for filtering coarse debris and materials from the airstream. The first air filtering stage may include a screen assembly for capturing coarse dust and debris in the airstream that passes through the first plenum, a cleaning mechanism for removing dust and debris from the screen on a continuing basis, and/or an airlock for receiving and sequestering debris removed from the screen by the cleaning mechanism for removal from the dust control system. In some embodiments, the screen may be a static screen without any pathways or gaps around the screen, such that the airstream in the dust control system must pass through the screen. The sealed condition of the screen limits the size of material or particles passing through the first air filtering stage to those that are small enough to pass through the screen. The screen may include one or more layers of perforated filter material including a perforated metal sheet (e.g., aluminum, stainless steel, etc.), a perforated polymer sheet (e.g., polyurethane, polyvinyl chloride, polyethylene, nylon etc.), or other appropriate materials. The size of the perforations in the screen may have diameter in a range of about 0.5 mm to about 10 mm. In some examples, the screen may be a metal mesh filter having a thickness in a range of about 2 mm to about 10 mm.

The cleaning mechanism of the first air filtering stage may work in a continuous, cycling manner so as to avoid the accumulation of dust and debris on the screen during operation of the dust control system and/or the harvester, conditioner, or other vehicle or implement in which the dust control system is incorporated. In such embodiments, the screen cleaning mechanism may be a mechanical wiping mechanism that is operable to pass over the upstream, proximal side of the screen to remove dust and debris collected thereon. For example, the mechanical wiping mechanism may include one or more semi-flexible blade-like structures that pass over the screen with sufficient pressure to dislodge dust and debris collected thereon. The blade-like structure may pass over the screen at regular intervals as part of a cycling or rotating mechanism. In some implementations, the wiping mechanism may include a cycling belt having wiper blade structures positioned at intervals along the cycling belt and that contact the upstream, proximal surface of the screen. The wiper blades may have a width that is greater than or equal to a dimension of the screen (e.g., the width or height) such that the wiper contacts the entire upstream, proximal surface of the screen in the course of cycling over it. The belt may be mounted on rotating sprockets or wheels positioned at opposing ends of the screen (top and bottom, one at each lateral side of the screen, etc.) such that the blades are able to clean the entire surface of the screen with one or more passes. The blades may include flexible polymeric materials that allow the blades to be semi-flexible and/or semi-compressible as they apply sufficient pressure to the screen surface to remove dust from the screen. For example, the blades may comprise silicone rubber, ethylene propylene diene monomer (EPDM) rubber, butyl rubber, and other suitable polymeric materials. The cycling belt may be paired with a collection mechanism for removing the dust and debris collected thereby. For example, the collection mechanism may include (1) a conveyor located below the cycling belt onto which the dust and debris collected by the wiper blades of the cycling belt are deposited, and (2) an airlock that receives the dust and debris from the conveyor. In other embodiments, the collection mechanism may include a chamber below the cycling belt that collects the dust and debris and routes it to an airlock. The airlock may sequester the dust and debris from the airstream and discharge it to the exterior of the dust control system without generating dust pollution in the ambient air.

In some implementations the mechanical wiping mechanism may include one or more paddle wheel like structures having an axis of rotation that is substantially perpendicular to upstream, proximal surface of the screen. The one or more paddle wheel like structures may include multiple semi-flexible blades that each pass over the upstream, proximal surface of the screen at regular intervals as determined by the rotational velocity of the paddle wheel. The paddle wheel may be positioned such that the semi-flexible blades are in contact with the upstream, proximal surface of the screen such that semi-flexible blades apply sufficient pressure to the screen surface to dislodge the dust that collects on the screen from the airstream. In some examples, the semi-flexible blades may be positioned with sufficient pressure to slightly deform the blades when they are in contact with the surface of the screen. The blades may include one or more flexible polymeric materials that allow the blades to be semi-flexible. The paddle wheel blades may include polymeric materials similar to those described above for the blades of the cycling belt mechanism.

The mechanical wiping mechanism may be paired with an airlock that receives the dust and debris from the wiping mechanism in a sealed chamber allowing the dust and debris to be trapped and sequestered from the airstream passing through the first stage of the dust control system. In some embodiments, the paddle wheel wiping mechanism may be paired with a specially designed airlock chamber that has a cylindrical collection portion that sits over a portion of the paddle wheel like a housing in a rotary airlock design. The housing may have a complementary shape to the paddle wheel and a disposal duct into which the dust and debris collected by the paddle wheel blades may be passed. The cylindrical portion may be shaped such that the blades of the paddle wheel may rotate and pass through the chamber while maintaining a substantially airtight seal in the airlock chamber to prevent the escape of dust and debris from the airlock chamber and to prevent air turbulence in the air lock. In some examples, the cylindrical portion may have the shape of a horizontal cylinder segment with a length that is substantially equal to the width of the paddle wheel blades and a radius substantially equal to the radial length of the paddle wheel blades. The cylindrical portion of the airlock chamber may be shaped such that its longitudinal axis is concentric with the axle (and central axis) of the paddle wheel and includes about ⅓ to about ⅔ of the circumference of a cylinder, such that each paddle wheel blade is completely within airlock chamber for about ⅓ to about ⅔ of its entire rotational path. For example, in some embodiments, the airlock chamber may have three areas sheltered from the airflow of the first plenum: two airtight sections that are closed off from the airflow of the first plenum by the blades of the paddle wheel, and a third section that is open to the chute through which the dust and debris is discharged from the airlock, where the two airtight sections flank the open section. For example, the airlock chamber may include in sequence a first airtight section that occupies about ⅛ of the rotational path of the paddle wheel, an open section occupies about ⅛ of the rotational path of the paddle wheel, and a second airtight section occupies about ⅛ of the rotational path of the paddle wheel.

The complementary dimensions of the airlock chamber and the paddle wheel blades allows the paddle wheel blades to rotate around the paddle wheel axle and maintain contact with the outer curved wall and the proximal and distal walls of the airlock chamber when they are within the airlock chamber, thereby maintaining a seal in the airlock chamber. Specifically, the distal edge of the paddle wheel blades may maintain contact with the outer curved wall, a first lateral edge of the paddle wheel blades may maintain contact with the proximal wall, and a second lateral edge of the paddle wheel blades may maintain contact with the distal wall of the airlock chamber as the paddle wheel blades rotate through the airlock chamber.

The airlock chamber may include a discharge duct for passing the dust and debris from the airlock to the exterior of the dust control system. In some embodiments, the collection space may be below the paddle wheel to allow the dust and debris to fall from the paddle wheel through the discharge duct. As the paddle wheel rotates, the paddle wheel blades collect dust and debris from the surface of the screen and push the dust and debris into the cylindrical portion of the airlock chamber, which may be located on the bottom side of the paddle wheel to allow the dust and debris collected by the paddle wheel blades to fall from the paddle wheel into the discharge duct. In some embodiments, the collection space may be positioned somewhere other than below the paddle wheel for purposes of design efficiencies, such as saving space, and the dust and debris may be collected from the paddle wheel at least partially through the movement of the blades. The airlock chamber may prevent the passage of turbulent air from the dust control system and is thereby able to discharge debris collected therein to the ambient air without creating particulate air pollution. The airlock (and other airlocks in the system) along with the novel air filtering stages of the present invention allow harvesters and other machines incorporating the dust control system to operate continuously for extended periods without the need for cleaning or maintenance.

In some embodiments, the screen cleaning mechanism may include multiple paddle wheel wiping mechanisms arranged such that each paddle wheel covers a particular area of the screen, and each is paired with a cylindrical collection portion of an airlock chamber for collecting dust and debris from the paddle wheel. For example, the screen cleaning mechanism may include two bilateral paddle wheels that each sweep over their respective lateral sides of the static screen, and each concentrically paired with a cylindrical collection portion of an airlock chamber. In some embodiments, the radii of the paddle wheels may meet at the center of the screen. In other embodiments, the radii of the paddle wheels may overlap (e.g., like a Venn diagram) and the positions of the blades of each paddle wheel may be staggered to avoid collisions of the blades. In such embodiments, the paddle wheels may share a common airlock, in which the cylindrical collection portions are connected to a common collection space. In other embodiments, the paddle wheels may each be paired with independent airlocks that are not in fluid communication.

In still other embodiments, the first stage may be a cycling mesh chain or belt through which the airstream passes. The cycling mesh chain may be mounted on rotating sprockets or wheels positioned at the corners of a passage from the first plenum to the later stages of the dust control system, and may have a sufficient width and height to cover the passage, requiring the entire airstream to pass through the chain. The cycling chain may be framed on the upstream proximal side of the chain and/or the downstream, distal side of the chain such that there are substantially no gaps between the mesh chain and the passage. As the airstream passes through the mesh chain dust and debris are collected by the chain, and are carried downward toward a collection structure at the bottom of the rotating chain, in which they are deposited. The collection structure may be below the mesh chain that collects the dust and debris and may include an airlock chamber to which the conveyor delivers the dust and debris, a chamber in which a partial vacuum is applied to remove the dust and debris from the mesh chain, a combination of a rotating brush (e.g., a brush with a width about equal to that of the chain and parallel with the rotation axes of the sprockets or wheels around which the mesh chain is cycled), or other collection mechanism and a collection chamber into which the brush sweeps the dust and debris, which collects the dust and debris from the chain.

After the airstream passes through the first air filtering stage, the airstream is passed to a second filtering stage of the dust control system. The second air filtering stage may include a plurality of vortex tube separators operable to remove finer dust and particles from the airstream. The vortex tube separators of the present invention may be operable to remove a substantial proportion of fine particulates from the airstream, including PM 2.5 particles (e.g., silica particles). The vortex tube separators may be arranged and incorporated into the second air filtering stage such that the airstream received from the first filtering stage must pass through the vortex tube separators. The second filtering stage may be substantially airtight except for the passages through the vortex tube separators and fluid communication with a second stage collection structure. The vortex tube separators may be arranged in an airtight rack structure (a "separator rack"), such that the proximal ends of each vortex tube are arranged in parallel alignment with proximal openings in fluid communication with the airstream passing though the screen. The separator rack may include a central chamber through which the vortex tube separators pass. The vortex tube separators may each have a particulate collection pathway (e.g., a duct) that expels a particulate-laden "dirty" airstream into the central chamber for collection. The central chamber may be in fluid communication with a second collection structure (e.g., an airlock and/or a collection trough) that can expel the collected dust from the dust control system.

The separator rack may have a distal end (e.g., a wall) through which cleaned air from the vortex tube separators is expelled into a second plenum. The distal wall of the separator rack may be airtight, allowing only the clean airstream from the distal clean air collection structures of the vortex tubes to enter the second plenum. The clean air may then be discharged from the dust control system into the ambient without significant amounts of dust or particulate matter.

The vortex tube separators of the present invention may have an improved design over conventional vortex tubes that allows for the improved performance of the dust control system of the present invention and a reduced overall size of the dust control system. Each of the vortex tube separators may have a proximal opening through which a portion of the airstream enters the vortex tube. The proximal opening may include a flared outer conical rim structure that minimizes turbulence in the flow of the airstream passing from the screen into the vortex tube separator, a central deflection cone that deflects the incoming air toward the perimeter of the vortex tube, and/or angled blades positioned between the axial center of the vortex tube and the perimeter of the vortex tube to create a spiral flow of the airstream in a pre-determined rotational direction (e.g. clockwise or counterclockwise). The deflection and rotational direction of the airstream results in a spiralized flow of the entering air such that particles in the airstream are driven to the perimeter of the vortex tube by centrifugal force resulting from the spiralized flow.

The central deflection cone enhances the spiral flow of the particulate laden air stream in relation to conventional separation mechanisms in multiple ways. First, the central deflection cone reduces the radial distance that a particle must travel to reach the perimeter wall of the vortex tube. The diameter of the central deflection cone may be in a range of about 30% to about 70% of the diameter of the proximal opening of the vortex tube (e.g., about 40% to about 60% of the diameter of the proximal opening, about 50% of the diameter of the proximal opening, or any value or range of values therein). Second, its convex anterior profile deflects the airstream and particles toward the perimeter wall of the vortex tube. These two effects of the cone in combination with the angled blades results in a more efficient movement of the particulate material to the perimeter of the vortex tube and an enhanced vortex effect with higher velocity and a greater number of spins within the vortex tube. As a consequence, the vortex tubes of the present invention enhance the centrifugal force on the particulate matter passing therethrough and the separation of particulate matter from the airstream. Additionally, the distal end of the cone may be blunt or open, which may create a turbulent, separated flow that further prevents the particulate matter from moving toward the central area of the vortex tube and helps to keep the particulates at the perimeter of the vortex tube.

The distal end of the vortex tubes may include a central conical collection structure for passing the filtered, cleaned airstream present in the medial areas of the vortex tube on to a second plenum for collecting cleaned air, and a distal particulate collection pathway around the distal perimeter of the vortex tube for collecting the particulate matter that is spun to the outer perimeter of the vortex tube. There may be a circumferential gap between the outer perimeter of the vortex tube and the central conical collection structure through which the particulate matter may pass. At the distal end of the gap may be a spiral path that leads to a collection duct that routes the particulate matter to the central chamber of the separator rack. The size of the gap and spiral pathway may be proportioned in order to enhance the performance of the vortex tube separators. The ratio of the area of the gap and spiral pathway may be in a pre-determined range of greater than about 10% to about 25% of the area of the clean air pathway through the central conical collection structure (e.g., about 15% to about 20% of the area of the clean air pathway). This proportion of the gap and spiral pathway provides a smoother path for the particulates allowing them to pass out of the vortex tube separator through the perimeter spiral pathway with substantially reduced turbulence and negligible re-entrainment of the particulate matter into the clean air pathway.

The vortex tube separators may be of relatively small size and arranged in close proximity in the separator rack. The vortex tubes may have a length in a range of about 2.5 inches to about 24 inches, and may have a diameter in a range of about 0.75 inches to about 8 inches. The vortex tubes may be arranged in adjacent, parallel columns in a space efficient manner. In some implementations, the adjacent columns may be staggered such that the space can be conserved in the array of vortex tubes. More specifically, the vortex tubes have a circular circumference and space can be conserved by staggering adjacent column such that a lateral portion of a vortex tube in a first column sits between and is vertically overlapped by the lateral portions of two vortex tubes in a second column. Also, in some embodiments, pairs of adjacent columns may be spaced from other pairs of adjacent columns to provide paths for airflow from the distal particulate collection pathway. A gap between adjacent column pairs of a few inches (e.g., about 1 inches to about 4 inches) may be sufficient to prevent high pressure areas that may affect airflow in the vortex tube separators. In some embodiments, the vortex tubes of two adjacent columns may have opposite rotational directions, such that the perimeter particulate collection pathways of each column direct the flow of particulate matter into the adjacent gaps. Such arrangement may allow for minimizing the volume occupied by the second filtering stage and more efficient use of space. This provides a significant improvement over conventional separation and filtration techniques, which may require much larger volumes to accommodate an air filtering system capable of handling about 10,000 CFM to about 20,000 CFM. The use of a plurality of vortex tube separators of a relatively small size and the arrangement in a closely packed separator rack structure provides significant efficiencies with respect to the volume of the filtering mechanisms of the present invention. It is to be understood that other arrangements of the vortex tubes are contemplated within the scope of the present invention.

The second filtering stage may include a particulate collection structure for collecting, sequestering, and disposing of particulate matter discharged into the central chamber of the separator rack. The particulate collection structure may include a collection conduit that is in fluid communication with the central chamber of the separator rack. The dirty air expelled from the distal particulate collection pathways of each of the vortex tube separators may enter into the central chamber and settle toward the bottom of the chamber. In some embodiments, the collection ducts of the vortex tube separators may be directed downward, such that the particulate matter is propelled toward the bottom of the central chamber. In some embodiments, the collection conduit or opening may be positioned at or near the bottom of the central chamber, such that it is able to collect settling particulate material. The second collection structure may include an airlock for trapping the particulate matter to prevent re-entrainment of the particulate matter in the air circulating through the central chamber. In some embodiments, the second collection structure may include a trough for collecting particulates falling out of the particulate-laden airstream. The particulate-laden airstream may have about 10% to about 25% of the total air being pulled through the dust control system, with about 75% to about 90% of the air being filtered and cleaned by the vortex tubes. The vortex tubes (separator rack) are operable to remove greater than about 95 wt % (e.g., greater than about 97 wt %, about 95 wt % to about 99 wt %, about 97% to about 99%, etc.) of the particulate material in the airstream taken into the dust control system, concentrating the particulates in the scavenged air flow from the separator rack. Thus, dirty air that is scavenged from the vortex tubes is heavily laden with particulates. About 35 wt % to about 65 wt % (e.g., about 45 wt % to about 55 wt %) of the particulates in the particulate-laden airstream settle out of of the airstream due to gravity. The particulate laden airstream may fall into a trough or other structure in the second collection structure, and may then be moved into an airlock by a collection mechanism (e.g., an augur, etc.).

In some embodiments, the airlock may be a rotary airlock design to which a collection conduit of the separator rack may deliver a particulate-laden airstream. The rotary airlock may use a paddle wheel to maintain a sealed airlock to trap particulate matter on the distal side of the paddle wheel. The paddle wheel may be nested within a cylindrical chamber that may be concentric with the axel of the paddle wheel. The cylindrical chamber may have a proximal opening into which the dirty airstream from the collection conduit is delivered, and a distal opening from which the dirty air and particulate matter exits the rotary airlock mechanism and is discharged from the dust control system without creating particulate pollution. The rotary airlock may maintain an airtight seal from the collection conduit, thereby allowing the discharge of particulate matter from the airlock to the exterior of the dust control system without significant airflow to cause turbulence and particulate pollution.

In other embodiments, the collection mechanism may be a spiral conduit section (e.g., like an Archimedes screw) through which the dirty air passes prior to arriving at the airlock. The spiral conduit section may aid in trapping the particulate matter at the distal side of the collection conduit in the airlock chamber. The collection conduit may deliver the dirty air to the proximal end of spiral conduit section and the dirty air may pass through several spiral rotations before reaching the distal end of the conduit and exiting into the airlock. The spiral conduit may have spiral rotations in a range of about 540° to about 3600°, providing sufficient length of the constrained airflow path to prevent the back flow of dirty air and re-entrainment of the particulate matter into the central chamber of the separator rack.

In some embodiments, the dust control system may include a third filtering stage that scavenges the dirty air from central chamber of the separator rack and conditions the captured dirty air to further capture particulate matter and produce further clean air to be delivered into a plenum for release into the ambient air. In some embodiments, the third filtering stage may utilize one or more centrifugal separators, e.g., cyclone separators. The cyclone separator(s) may include an upper cylindrical section (a barrel), a lower conical section (a cone), an influent port on the lateral side of the barrel near the superior end of the cyclone separator, an effluent port on the distal, inferior end of the cone, and a clean air discharge port on the superior end of the barrel. The dirty, particulate-laden airstream discharged from the vortex tubes (e.g., central chamber of the separator rack) may be in fluid communication with the influent port and the dirty air may pass into the barrel of the cyclone chamber. The influent port and the distal end of the third stage collection duct may be positioned such that they are both about perpendicular to the longitudinal axis of the cyclone separator and tangentially to the outer wall of the barrel. This positioning delivers the dirty air into the perimeter of the barrel such that a spiralized flow around the perimeter of the barrel is induced in the dirty air entering the barrel. They cyclone chamber(s) thus creates a centrifugal force by means of a vortex that results in the inertial forces of the particulate matter in the dirty air stream keeping the particulate matter on the perimeter of the barrel. The particle laden air stream travels downward through the barrel into the cone. When the air reaches the bottom of the cone, it begins to flow radially inwards and then upward toward the top of the barrel as clean air while the particulates fall through an effluent port at the end of the cone for collection.

The cleaned air may exit the cyclone separator(s) through the clean air discharge port and may be collected and routed to a plenum to be mixed with the cleaned air from the separator rack and then discharged to the ambient air. The dirty air that exits through the effluent duct at the distal end of the cone may be collected in a second collection structure that leads to an airlock for sequestering the particulate matter. The airlock may be a rotary airlock as described herein. The airlock may maintain an airtight seal from the rest of the dust control system, thereby allowing the discharge of particulate matter from the airlock to the exterior of the dust control system without significant airflow to cause turbulence and particulate pollution. After passing through the airlock, the particulate matter collected by the cyclone separator may be discharged to the exterior of the dust control system though a discharge port on the downstream side of the airlock.

In some embodiments, the third filtering stage may include one or more large cyclone separators that receive the particulate-laden airstream from one or more collection ducts in fluid communication with the central chamber of the vortex tube separator rack. In such embodiments, the collection duct(s) may deliver dirty air into a barrel of the cyclone separator through an influent port in a path that is tangential to the outer wall of the barrel. The tangential delivery may spiralize the air flow around the perimeter of the barrel, thus creating a vortex that results in the inertial forces of the particulate matter in the dirty air stream keeping the particulate matter on the perimeter of the barrel. The dirty air stream may travel downward through the barrel into a cone. At the bottom of the cone, the particulate matter discharges through a discharge port into the secondary collection structure (e.g., an airlock) and the clean air flows radially inwards and upward toward the top of the barrel to be delivered into a plenum for release into the ambient air.

In other embodiments, the third filtering stage may include a second separator rack that includes an array of cyclone separators. The particulate-laden airstream may be in fluid communication with the second separator rack, which may have one or more rows of cyclone separators (e.g., arranged in a grid pattern). The distal ends of the cyclone separators may be connected by airtight seal to a rack plate. The airtight seal results in the movement of the airflow from the particulate-laden airstream through the cyclone separators via their influent ports. The particulate-laden air passes through the cyclone separators, as there is no other available path through the third filtering stage. The particulate-laden airstream may enter a barrel of each cyclone separator through the influent port in a pathway that is tangential to the outer perimeter of the barrel. The particulate-laden airstream may then spiral around the barrel and through a narrowing cone of each cyclone separator toward the second collection structure that receives the particulate material from the inferior end of the cyclone separators, preventing re-entrainment of the particulate material. In some examples, the second separator rack may be positioned over the second collection structure such that the particulates expelled from the narrowing cone of the cyclone separators falls into the second collection structure. The particulates may then be moved into an airlock. Also, in some examples, the first and second separator racks may be positioned such that the clean air produced thereby pass into the same clean air collection plenum. The further clean air produced by the cyclone separators may be delivered into the plenum for release into the ambient air. Greater than about 95 wt % (e.g., greater than about 97 wt %, about 95 wt % to about 99 wt %, about 97 wt % to about 99%, etc.) of the remaining particulates in the particulate-laden airstream scavenged from the vortex tubes may be removed from the airstream by the second separator rack.

In still further embodiments, the dust control system incorporate a third air filtration stage in the separator rack. In such embodiments, the separator rack may include both vortex tube separators and cyclone separators. The vortex tube separators and the cyclone separators may be arranged in 1:1 pairs or other arrangements (e.g., 2:1 vortex tubes to cyclone separators, 3:1 vortex tubes to cyclone separators, etc.), where the distal particulate collection pathway of the vortex tube(s) may be in fluid communication with an influent port of a cyclone separator, where the cyclone separator acts as an additional (third stage) filtration mechanism for removing particulates from the airstream. The particulate matter from the vortex tube may enter a barrel of cyclone separator through the influent port in a pathway that is tangential to the outer perimeter of the barrel. The particulate-laden airstream may then spiral around the barrel and through the narrowing cone of the cyclone separator toward a particulate discharge outlet that is in fluid communication with the anterior wall of the separator rack. Thus, the particulate matter is expelled from the cyclone separator into a collection conduit leading to a collection system, such as an airlock. The clean air generated by the cyclone separator may pass through the opposite side of the separator rack into the second plenum through a clean air discharge port. The vortex tube separators and the cyclone separators may be of about the same length and have similar outer diameters, such that the cyclone separators may be incorporated into the separator rack without significantly altering the relatively small volume of the separator rack.

The effectiveness of the dust control system of the present invention is superior to conventional systems in that the multi-stage capture system is able to capture coarse materials and fine particulate matter in a stepwise process, resulting in a very clean airstream expelled by the system. The efficiency of the system is superior to prior dust suppression systems that utilize water to capture dust and particulate matter, as no mud is generated and there is no need to change out or replace water that is used in such system. Also, the dust control system is able to perform high volume filtration within a relatively small space, allowing it to be efficiently incorporated into harvesters, conditioners, and other machines. Furthermore, the dust control system of the present invention can be run for long periods without the need for maintenance or cleaning. The dust control system of the present invention both provides a system to prevent the dispersal of fine particulate matter in the air during conditioning and harvesting operations, and more efficient dust control system having a relatively small size and that requires very limited intermittent maintenance and cleaning.

Further aspects and embodiments will be apparent to those having skill in the art from the description and disclosure provided herein.

It is an object of the present invention to provide an improved dust control system that substantially prevents the generation of dust and particulate laden air during the harvesting nuts, fruit, or other crops from the ground.

It is a further object of the present invention to provide an improved dust control system that requires reduced maintenance and can run for longer periods without cleaning or conditioning.

It is a further object of the present invention to provide a multistage dust control system for use in a harvester, conditioner, or other farming machinery that is operable to remove both coarse debris and fine particulate material.

It is a further object of the present invention to a compact fine particle separation unit of a reduced size that utilizes a plurality of vortex tube separators operable to remove fine particulates from a fouled airstream and produce a clean volume of air substantially devoid of harmful particulate matter while occupying a relatively small space.

It is a further object of the present invention to provide a dust control system for use in a harvester, conditioner, or other farming machinery that is operable to remove fine particulate material from an airstream without the use of water or electrostatic mechanisms to capture fine particular material.

It is a further object of the present invention to provide a dust control system that includes a continuously self-cleaning screen filtering unit.

It is a further object of the present invention to provide a dust control system with a cleaning mechanism for a filter screen that also operates as an airlock mechanism.

The above-described objects, advantages and features of the invention, together with the organization and manner of operation thereof, will become apparent from the following detailed description when taken in conjunction with the accompanying drawings, wherein like elements have like numerals throughout the several drawings described herein. Further benefits and other advantages of the present invention will become readily apparent from the detailed description of the preferred embodiments.

BRIEF DESCRIPTION OF THE DRAWINGS

FIG. 11B provides a perspective view of a separator rack of a dust control system, according to an embodiment of the present invention.

FIG. 16A provides a perspective of a cyclone separator array of a dust control system, according to an embodiment of the present invention.

FIG. 16B provides an elevation view of a cyclone separator of a dust control system, according to an embodiment of the present invention.

FIG. 16C provides a cross-sectional view of a cyclone separator of a dust control system, according to an embodiment of the present invention.

DETAILED DESCRIPTION

Reference will now be made in detail to certain embodiments of the invention, examples of which are illustrated in the accompanying drawings. While the invention will be described in reference to these embodiments, it will be understood that they are not intended to limit the invention. To the contrary, the invention is intended to cover alternatives, modifications, and equivalents that are included within the spirit and scope of the invention. In the following disclosure, specific details are given to provide a thorough understanding of the invention. However, it will be apparent to one skilled in the art that the present invention may be practiced without all of the specific details provided.

Figure 1:
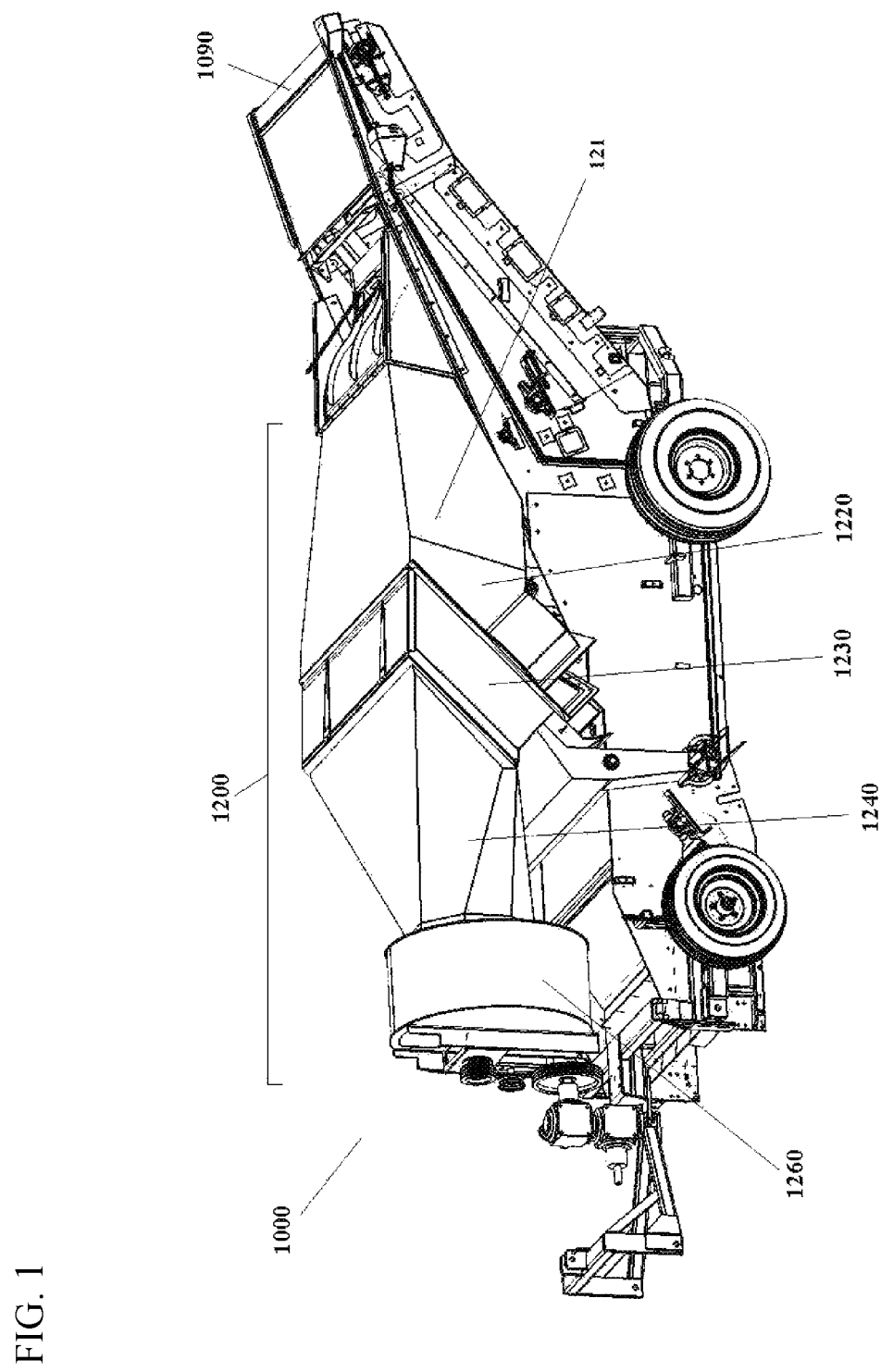
FIG. 1 provides a perspective view of a harvesting machine, according to an embodiment of the present invention.
Figure 2:
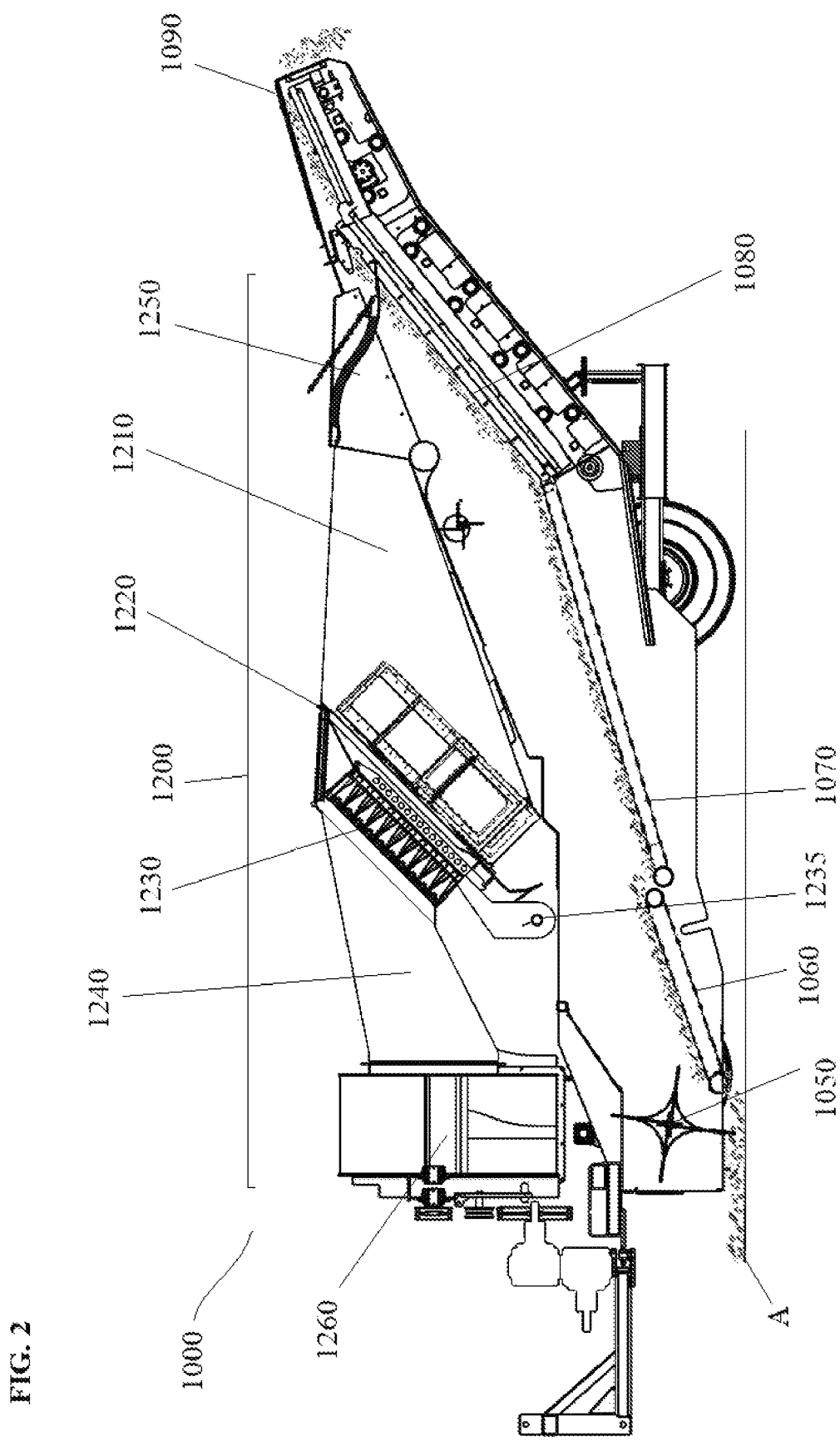
FIG. 2 provides a cross-sectional view of a harvesting machine, according to an embodiment of the present invention.

The present invention concerns a multi-stage dust control system that may be incorporated into a harvester, conditioner, or other farming equipment. FIGS. 1-2 provide views of an exemplary harvester 1000 incorporating a dust control system 1200 according to the present invention. The exemplary harvester 1000 is a towable harvester for collecting nuts, fruit, or other crops and depositing them in a container. The dust control system 1200 may be positioned over the collection conveyor 1060, cleaning conveyor 1070, and elevator conveyor 1080, such that it can draw dust and debris intermingled with the crop into the first plenum 1210.

The crop material A may be retrieved from the ground by a rotating brush 1050 that sweeps the crop material, along with soil and debris intermingled with it onto a collection conveyor 1060. The collection conveyor 1060 may deliver the collected crop material to a cleaning conveyor 1070, which may have a mesh or chain link belt that allows soil and debris smaller than the harvested fruit to fall to the ground. The cleaning conveyor 1070 then delivers the partially cleaned crop A to the elevator conveyor 1080, which passes the crop A to a discharge chute 1090 to a container or other collection structure.

FIGS. 2-6 provide views of an exemplary dust control system 1200. The dust control system 1200 collects dust and debris remaining intermingled with the crop A from the elevator conveyor 1080 through a duct 1250 that sits over the elevator chain 1080. A high volume fan 1260 is positioned at the terminal end of the dust control system 1200 and generates a significant airflow and a partial vacuum over the elevator conveyor 1080 to lift soil, leaves, twigs, and other debris into the first plenum 1210. The first plenum 1210 may be may be substantially air tight, allowing the fan 1260 to create a low-pressure environment that draws air and debris through the dust control system 1200. The first plenum 1210 may transition from a smaller to a larger cross-sectional area, which may have the effect of slowing down the flow of the air and debris to facilitate some of the dirt and trash to settle out of the airstream and to the floor of the first plenum 1210. The first plenum 1210 may be in fluid communication with and deliver the dirty air stream to a first filtering stage of the dust control system 1200.

Figure 3:
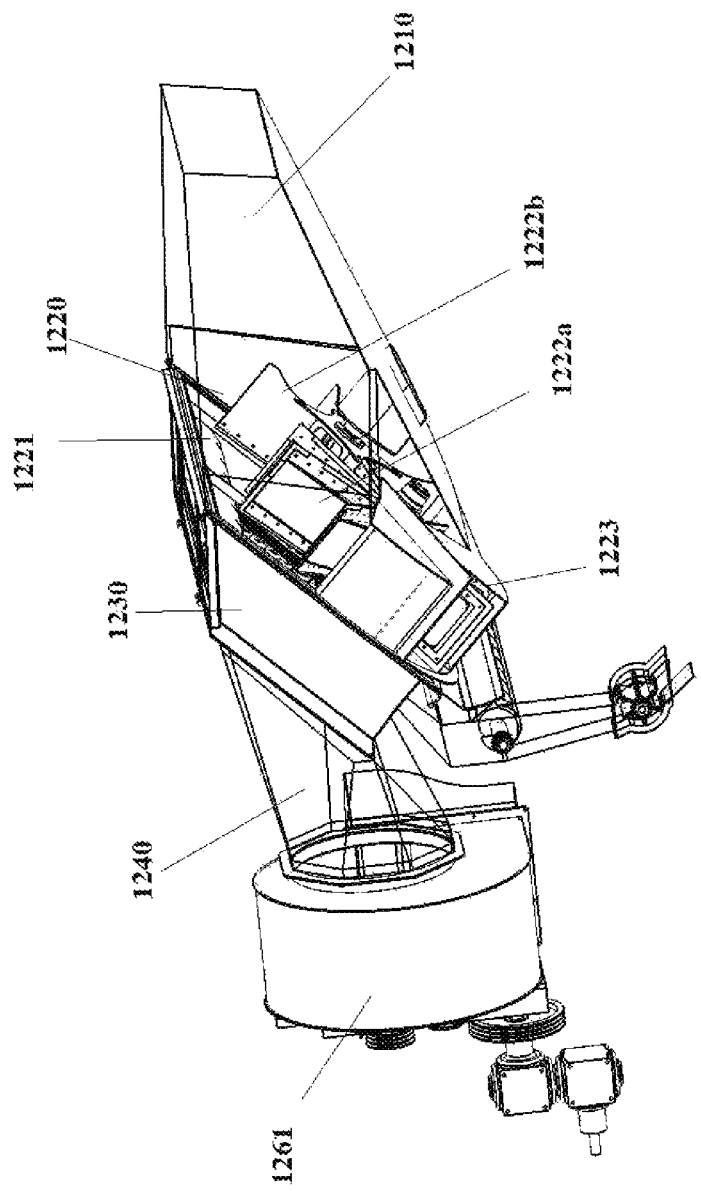
FIG. 3 provides a perspective view of a dust control system, according to an embodiment of the present invention.

The first filtering stage 1220 is shown in FIG. 3, in which the walls of the first plenum 1210 are shown as transparent for illustrative purposes. The first filtering stage 1220 may include a screen 1221 for capturing coarse dust and debris in the air stream that passes through the first plenum 1210, and a combination capture and cleaning mechanism operable to remove dust and debris from the upstream side of the screen 1221 and move the dust and debris into an airlock. The screen 1221 may be a static screen without any pathways or gaps around the screen, such that the airstream must pass through the screen to reach the later stages of the dust control system 1200. The screen 1221 may filter larger debris in the airstream such as leaves, twigs, and the like. The screen may include one or more layers of perforated filter material including a perforated metal sheet (e.g., aluminum, stainless steel, etc.), a perforated polymer sheet (e.g., polyurethane, polyvinyl chloride, polyethylene, nylon etc.), or other appropriate materials. The screen 1221 may have at least one rigid layer, allowing the cleaning mechanism to sweep over the screen 1221 without any significant deformation of the screen 1221. For example, the screen 1221 may have a metal layer with large perforations that allows a high rate of air flow through the screen and a finer mesh layer (e.g., a polymer screen material) with perforation sizes small enough to capture coarser clumps of dust. The size of the perforations in the screen 1221 may have diameter in a range of about 0.5 mm to about 10 mm.

Figure 4:
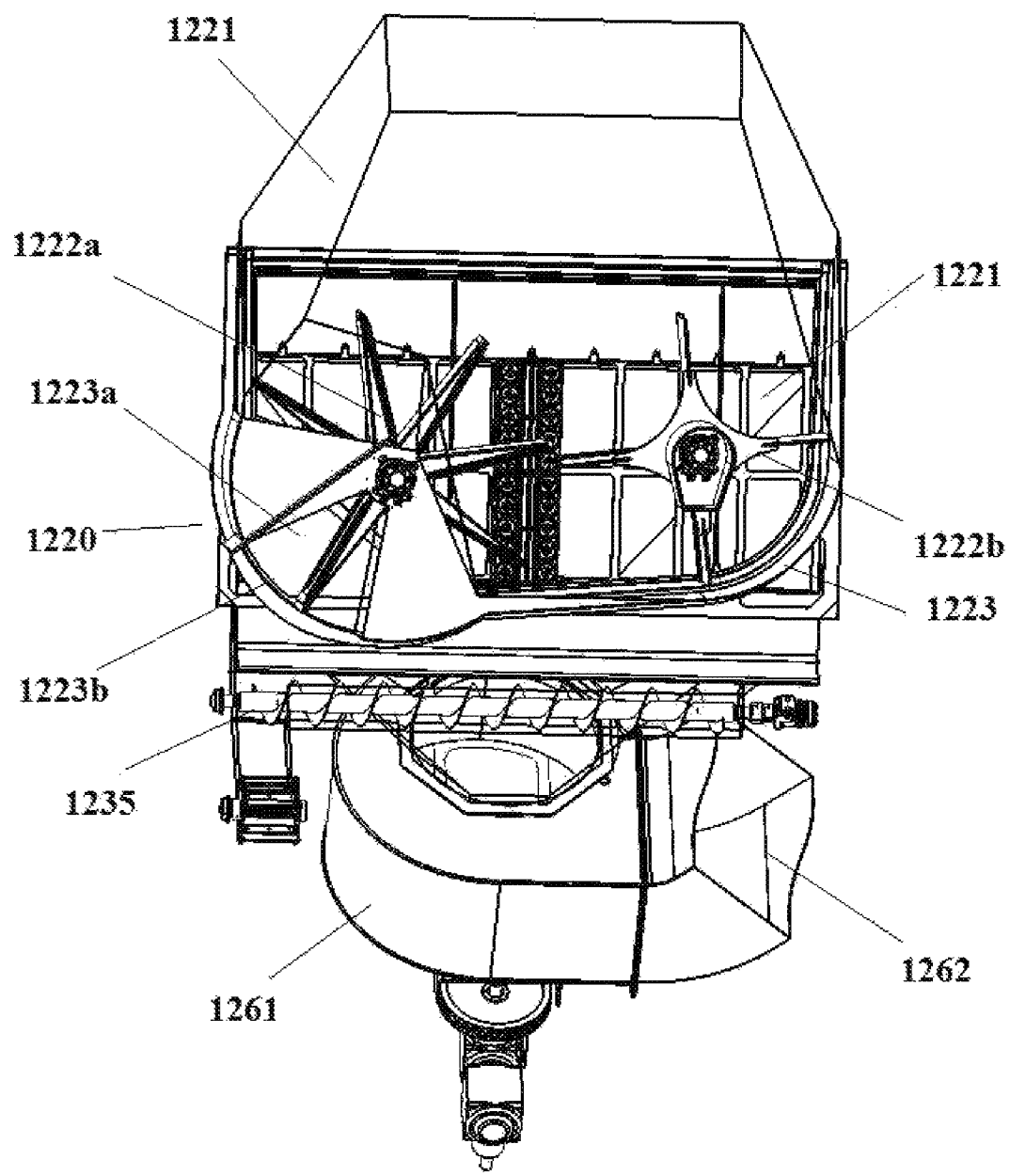
FIG. 4 provides a bottom view of a dust control system, according to an embodiment of the present invention.

The combination capture and cleaning mechanism of the first filtering stage 1220 is shown in FIG. 4 from the bottom side of the exemplary dust control system 1200, with the walls of the first plenum 1210 presented as transparent for illustrative purposes. The mechanism includes two paddle wheels 1222a and 1222b that are bilaterally arranged at the upstream side of the screen 1221 such that their rotational axes are perpendicular to the surface of the screen 1221 and the lateral edges of the blades of the paddle wheels abut the upstream surface of the screen 1221. The blades may be semi-flexible and pass over the screen 1221 with sufficient pressure to dislodge and collect dust and debris collected thereon. Each of paddle wheels 1222a and 1222b are within the walls of the first plenum 1210 and partially enclosed in a housing 1223, which allows dust and debris captured by the paddle wheels to be separated from the first plenum 1210 to prevent re-entrainment. The paddle wheel 1222a may be partially nested within an airlock housing 1223a, located within housing 1223. For illustrative purposes, the proximal wall of the housing 1223 and part of the proximal wall of the airlock housing 1223a are presented as transparent in FIG. 4.

The airlock housing 1223a may be shaped such that the blades of the paddle wheel 1222a may rotate and pass through the airlock housing 1223a while maintaining a substantially airtight seal to prevent the escape of dust and debris. The airlock housing 1223a may be in the shape of a horizontal cylinder segment with a length that is substantially equal to the width of the blades of paddle wheel 1222a, and have a radius substantially equal to the radial length of the paddle wheel blades. This shape allows the airlock housing 1223a to overlap with paddle wheel 1222a through a portion of its rotational path and thereby maintain an air seal between the first plenum 1210 and the airlock. For example, the airlock housing 1223a may overlap with a portion of the rotational path of the paddle wheel in a range of about ¼ to about ⅔ of its rotational path.

The paddle wheels 1222a and 1222b may rotate continuously during operation of the harvester 1000, so as to avoid the accumulation of dust and debris on the screen 1221. The paddle wheels 1222a and 1222b pass the collected dust and debris into the airlock housing 1223a. The paddle wheels may rotate in a clockwise manner from the perspective presented in FIG. 4, allowing paddle wheel 1222b to direct dust and debris it collects from the screen toward the paddle wheel 1222a from the base of the paddle wheel 1222b. Paddle wheel 1222a rotating in the same manner may collect the dust and debris from the paddle wheel 1222b and pass it though the paddle wheel housing 1223 into the airlock housing 1223a. The paddle wheels 1222a and 1222b may have overlapping rotational paths at the center of the screen 1221 to aid in the transfer of dust and debris to the paddle wheel 1222a. Once the dust and debris is passed into the airlock housing 1223a it becomes trapped and sequestered from the airstream passing through the dust control system 1200.

The airlock housing 1223a may be contiguous and in fluid communication with an airlock discharge duct 1223b for discharge of the collected debris to the exterior of the dust control system 1200. The discharge duct 1223b may be below paddle wheel 1222a to allow the dust and debris to fall from the paddle wheel 1222a easily.

Figure 4A:
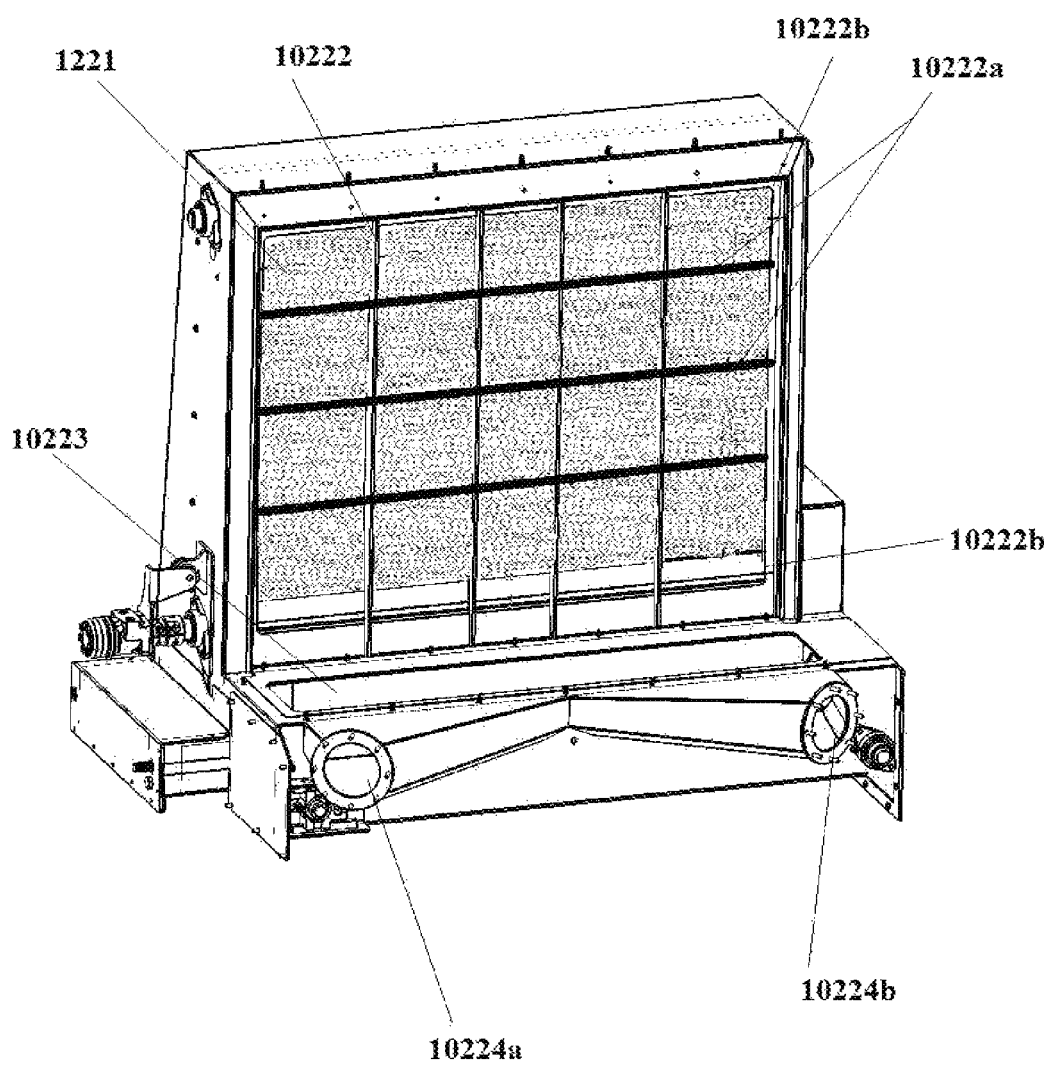
FIG. 4A provides a perspective view of a screen cleaning mechanism having cycling wiper blades, according to an embodiment of the present invention.
Figure 5:
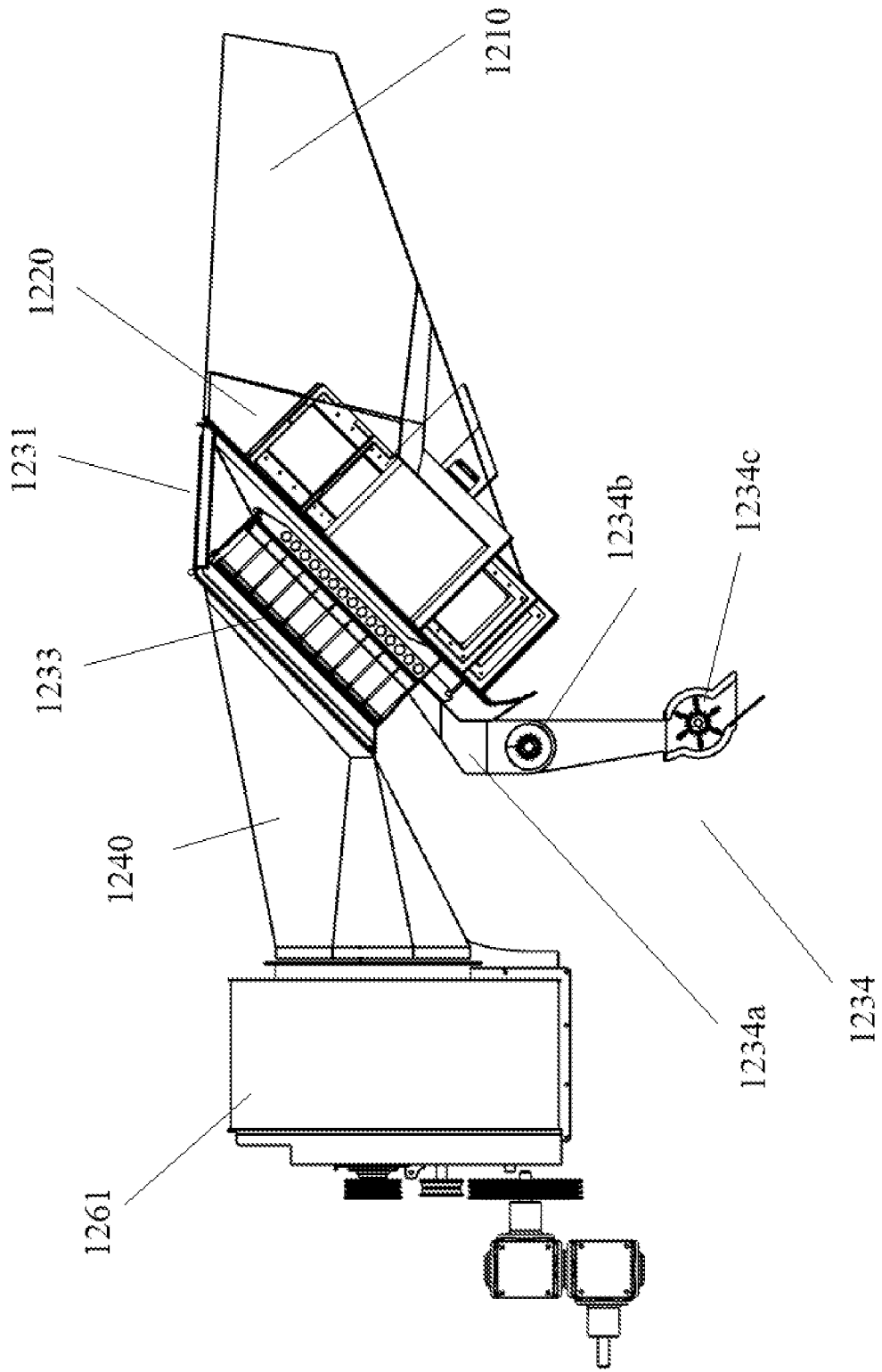
FIG. 5 provides a side elevation view of a dust control system, according to an embodiment of the present invention.

In some implementations, the screen wiping mechanism may include a cycling belt having wiper blade structures positioned at intervals along the cycling belt and that contact the upstream, proximal surface of the screen, as shown in FIG. 4A. The cycling belt assembly shown in FIG. 4A may be substituted into the dust control system 1200 for the paddle wheel system shown in FIG. 4. The cycling belt 10222 may include blades 10222a that contact the screen 1221. The blades 10222a may have a width that is greater than or equal to a dimension of the screen 1221. The belt may be mounted on rotating sprockets or wheels 10222b positioned at opposing ends of the screen 1221 such that the blades 10222a pass along the entire surface of the screen 1221. A collection chamber 10223 for receiving debris removed from the screen 1221 by the cycling belt 10222 may be positioned below the cycling belt 10222. A partial vacuum may be applied to the collection chamber 10223 to aid in the collection of dust and debris. The dust and debris may then be routed to an airlock through collection conduits 10224a and 10224b for discharge from the dust control system 1200.

The second filtering stage 1230 of the dust control system 1200, may receive the partially filtered airstream from the first filtering stage 1220, and may remove fine particulate matter therefrom. The second filtering stage 1230 may include a plurality of vortex tube separators 1231 operable to remove the finer dust and particles from the airstream. The vortex tube separators 1231 may be arranged and incorporated into a substantially airtight separator rack 1232. The separator rack 1232 may have a proximal wall that has an air tight seal around its edges forcing the airstream from the first filtering stage, a central chamber 1233, and a distal wall that is air tight with respect to the proximal wall and central chamber 1233 of the separator rack 1232. The proximal ends of the vortex tubes 1231 may be embedded in the anterior wall of the separator rack 1232 with a substantial airtight seal, and the distal central collection cones 1231e may be embedded in the posterior wall of the separator rack 1232 with a substantial airtight seal. The air cleaned by the vortex tubes 1231 may pass through the distal wall and expelled into second plenum 1240.

The passages through the vortex tube separators 1231 may be arranged in parallel alignment with proximal openings in fluid communication with the airstream passing though the screen and the distal ends being fluid communication with a second plenum 1240 into which the cleaned air passes. The separator rack 1232 may also include a central chamber 1233 into which the particulate material separated by the vortex tube separators 1231 is deposited. The central chamber 1233 may be in fluid communication with a dust collection assembly 1234 for collecting and sequestering the particulate material.

Figure 6A:
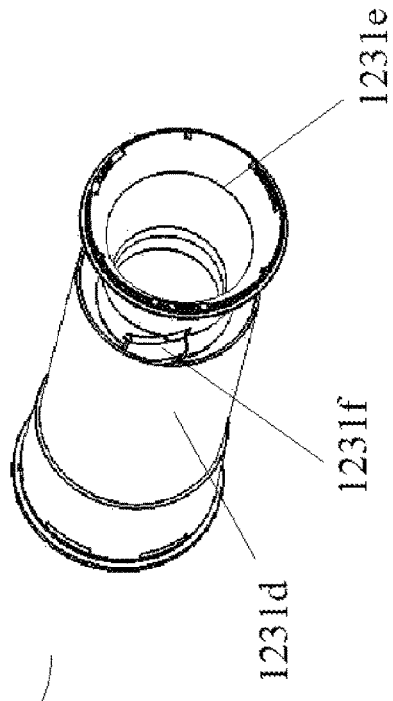
FIG. 6A provides a perspective view of a vortex tube separator of a dust control system, according to an embodiment of the present invention.
Figure 6B:
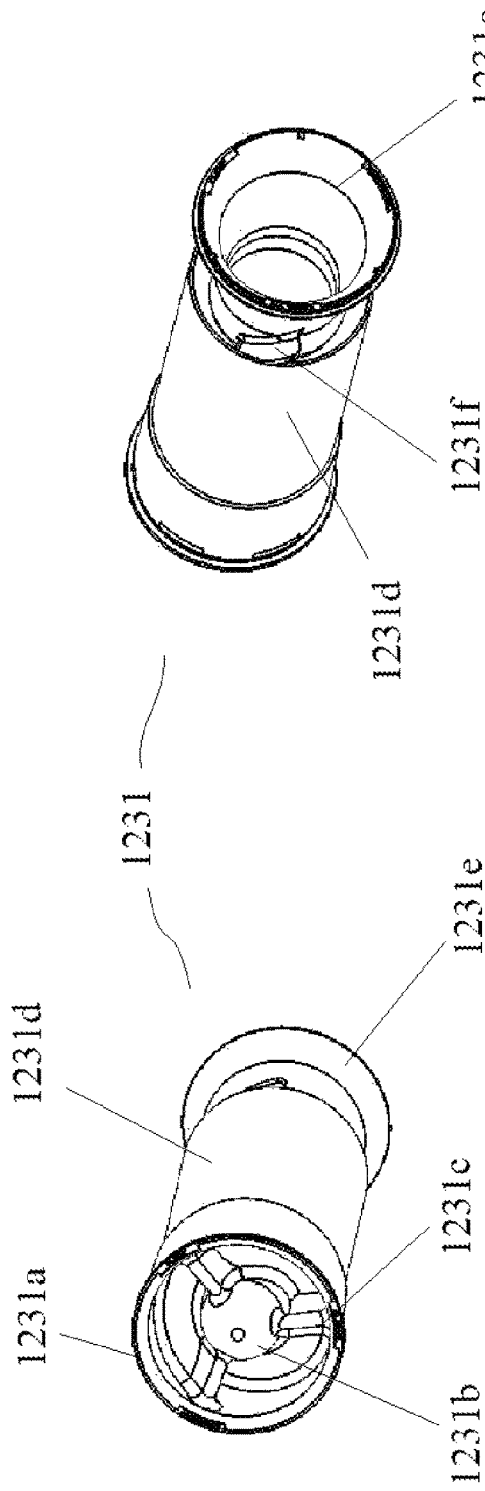
FIG. 6B provides a perspective view of a vortex tube separator of a dust control system, according to an embodiment of the present invention.
Figure 6C:
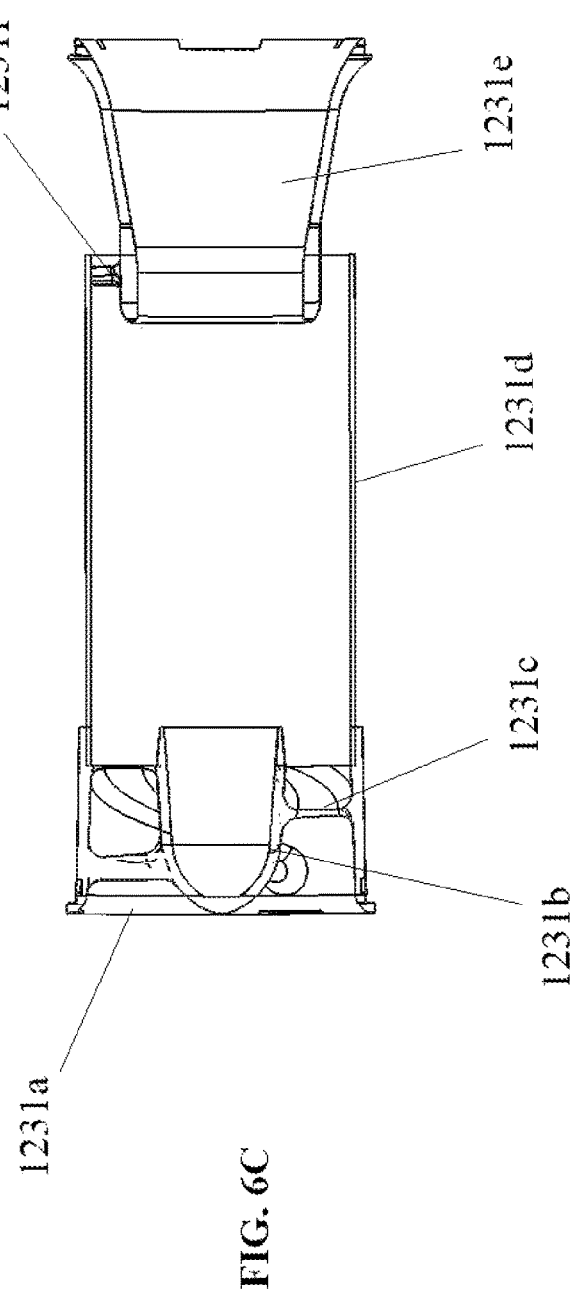
FIG. 6C provides a cross-sectional view of a vortex tube separator of a dust control system, according to an embodiment of the present invention.
Figure 7:
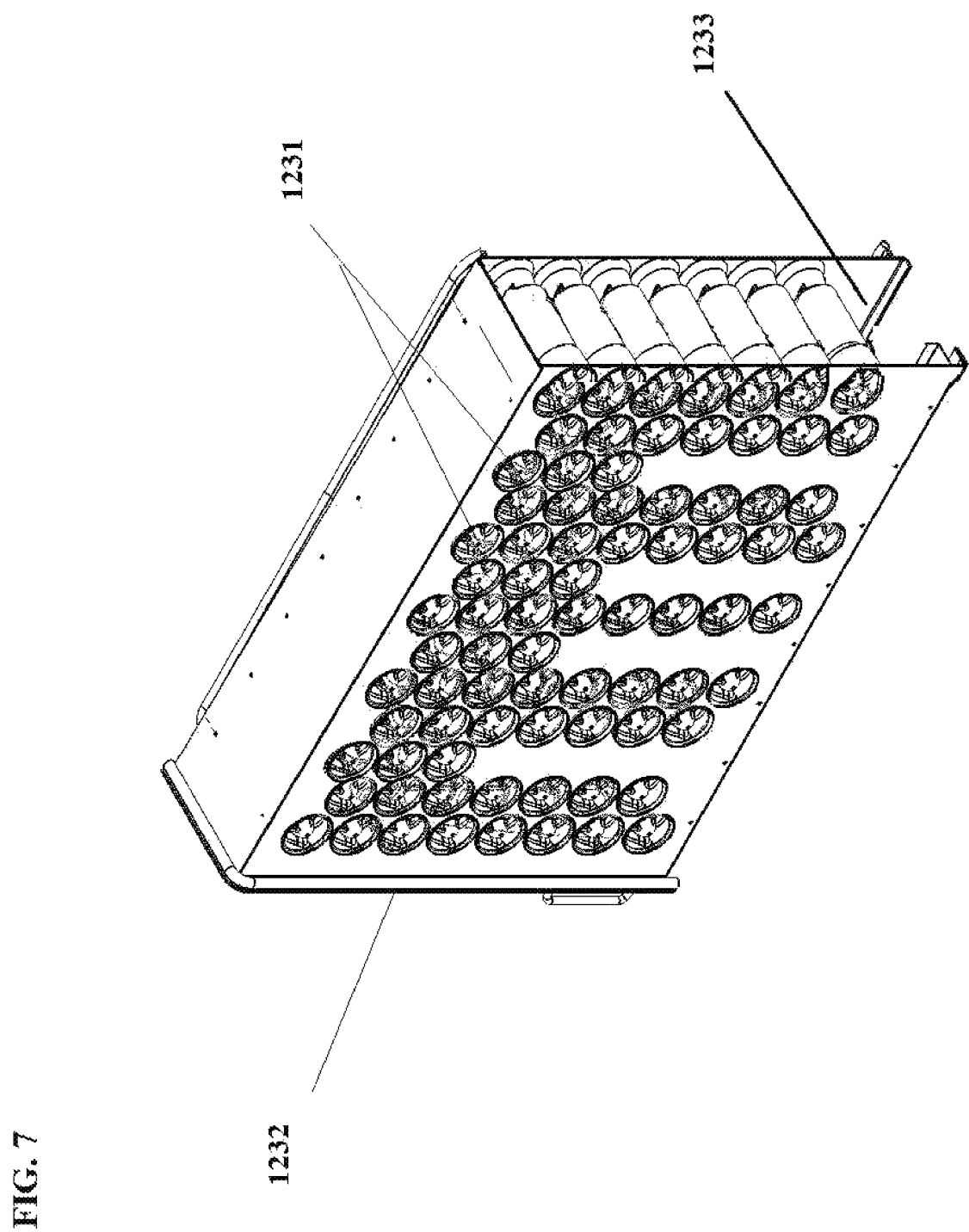
FIG. 7 provides a perspective view of a separator rack of a dust control system, according to an embodiment of the present invention.

The structure of the vortex tube separators 1231 is shown in FIGS. 6A-6C. Each of the vortex tube separators 1231 may have a proximal opening that may include a flared outer conical rim structure 1231a that minimizes turbulence of the inflowing air, a central deflection cone 1231b that deflects the incoming air toward the perimeter of the vortex tube 1231, and angled blades 1231c positioned between the central deflection cone 1231b and the perimeter of the vortex tube 1231 to create a spiralized flow of the entering air that drives particulates to the perimeter of the body 1231d of the vortex tube 1231. The vortex tube separators 1231 may be arranged in close proximity in the separator rack 1232, in adjacent, parallel columns. The adjacent columns may be staggered such that the space can be conserved in the array of vortex tubes 1231, as shown in FIG. 7. Pairs of adjacent columns may be spaced a distance apart from other pairs of columns to allow a pathway for particulate-laden air discharged from the vortex tube separators 1231 to flow to the bottom of the collection chamber 1233. This distance may be sufficient to prevent the development of high-pressure areas between the columns of vortex tube separators 1231 that may affect the air flow in the vortex tube separators 1231.

The distal end of the vortex tubes 1231 may include a central collection cone 1231e for passing the filtered, cleaned airstream present in the medial areas of the body 1231d onto a second plenum 1240 for collecting the cleaned airstream, and a perimeter spiral collection pathway 1231f for collecting the particulate matter that is spun to the outer perimeter of the body 1231d. There may be circumferential gap between the outer perimeter of the body 1231d and the central collection cone 1231e through which the particulate matter may pass. The spiral collection pathway 1231f may collect the dust and debris that passes through the gap and expel this particulate-laden "dirty" airstream into the central chamber 1233.

The central chamber 1233 may be in fluid communication with a particulate collection assembly 1234. The particulate collection assembly 1234 may include a collection duct 1234a located below the separator rack 1232 such that it is positioned to collect settling particulate matter expelled into the central chamber 1233. The collection duct 1234a may route the dirty airstream to a spiral duct 1234b, which may have a sufficient length and a sufficient number of turns to constrain the airflow path and prevent the back flow of dirty airstream and re-entrainment of the particulate matter. The dirty airstream may then be routed to an airlock 1234b to sequester the particulate matter on the distal side of the airlock 1234c. The airlock 1234c may be a rotary paddle wheel airlock as described herein. The rotary airlock 1234c may have a proximal opening into which the dirty airstream from the spiral collection conduit 1234b is delivered, and a distal opening from which the particulate matter is discharged from the dust control system 1200.

The cleaned airstream passing through the separator rack 1232 may be expelled though the distal ends of the vortex tube separators 1231 into the second plenum 1240 that is in fluid communication with a discharge duct 1262 through which the cleaned air may be released from the dust control system 1200 into the ambient air without significant amounts of dust or particulate matter. The cleaned airstream may be routed from the second plenum 1240 through the fan chamber 1261 by the suction created by the fan 1260 and then through the discharge duct 1262 (see FIG. 4).

Figure 8:
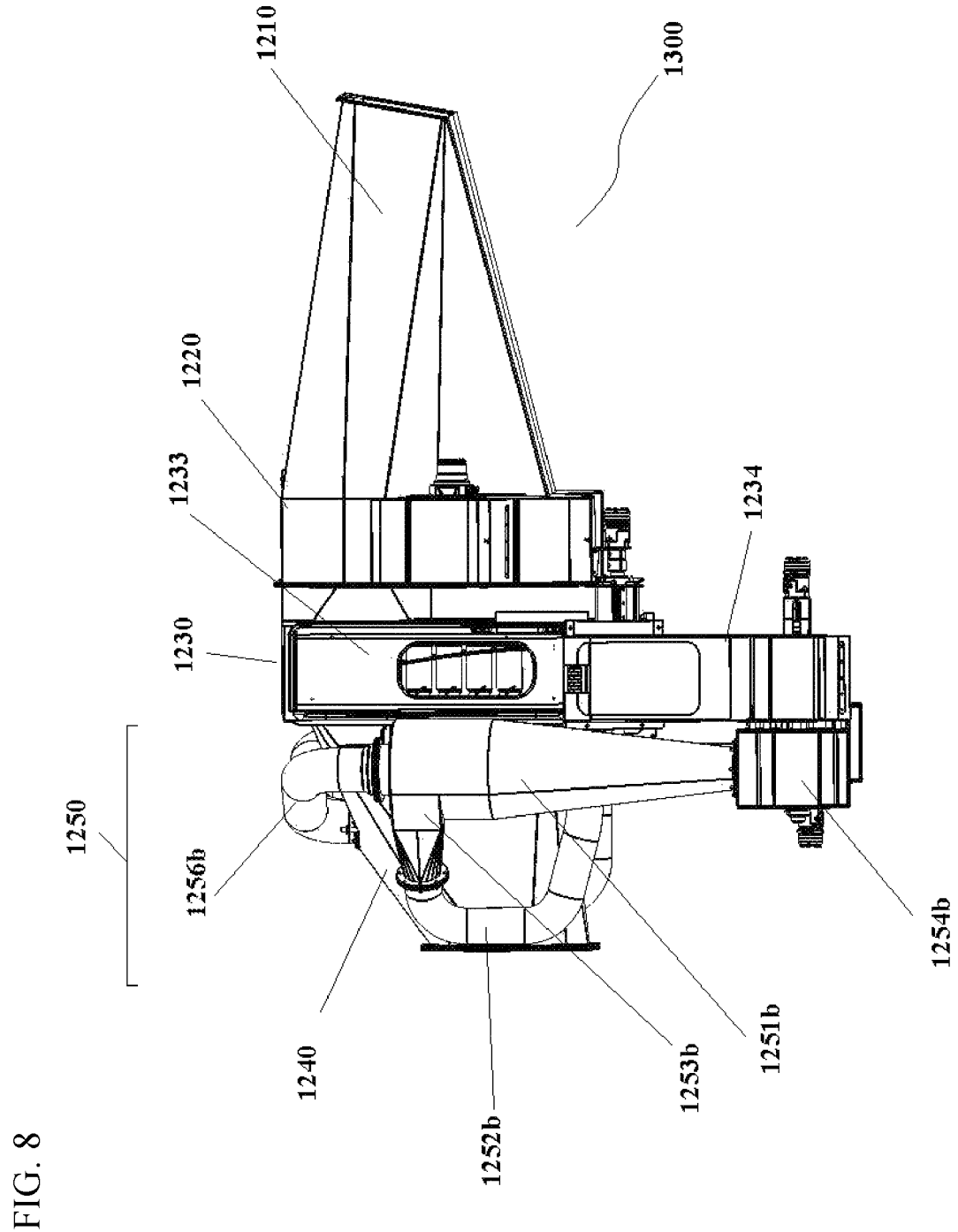
FIG. 8 provides a side elevation view of a dust control system, according to an embodiment of the present invention.
Figure 9:
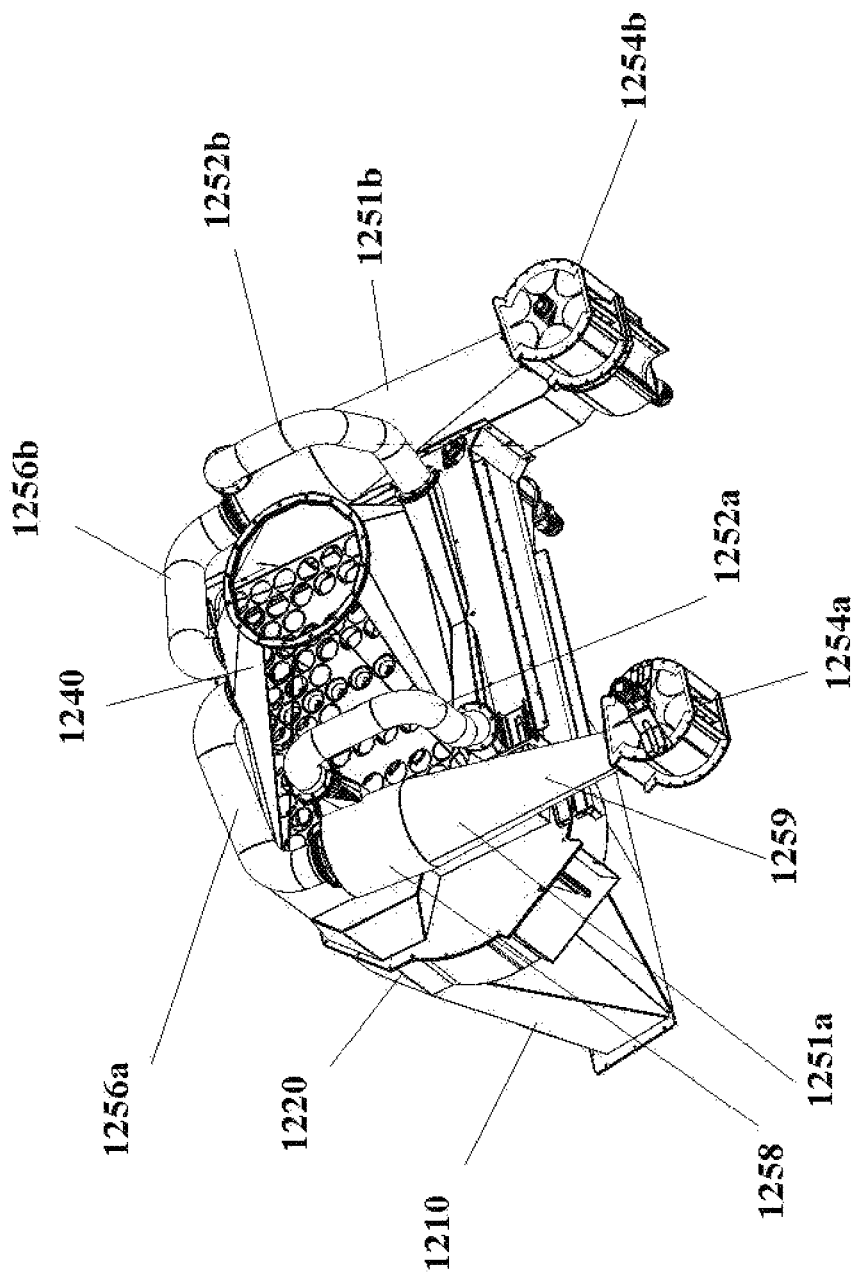
FIG. 9 provides a perspective view of a dust control system, according to an embodiment of the present invention.
Figure 10:
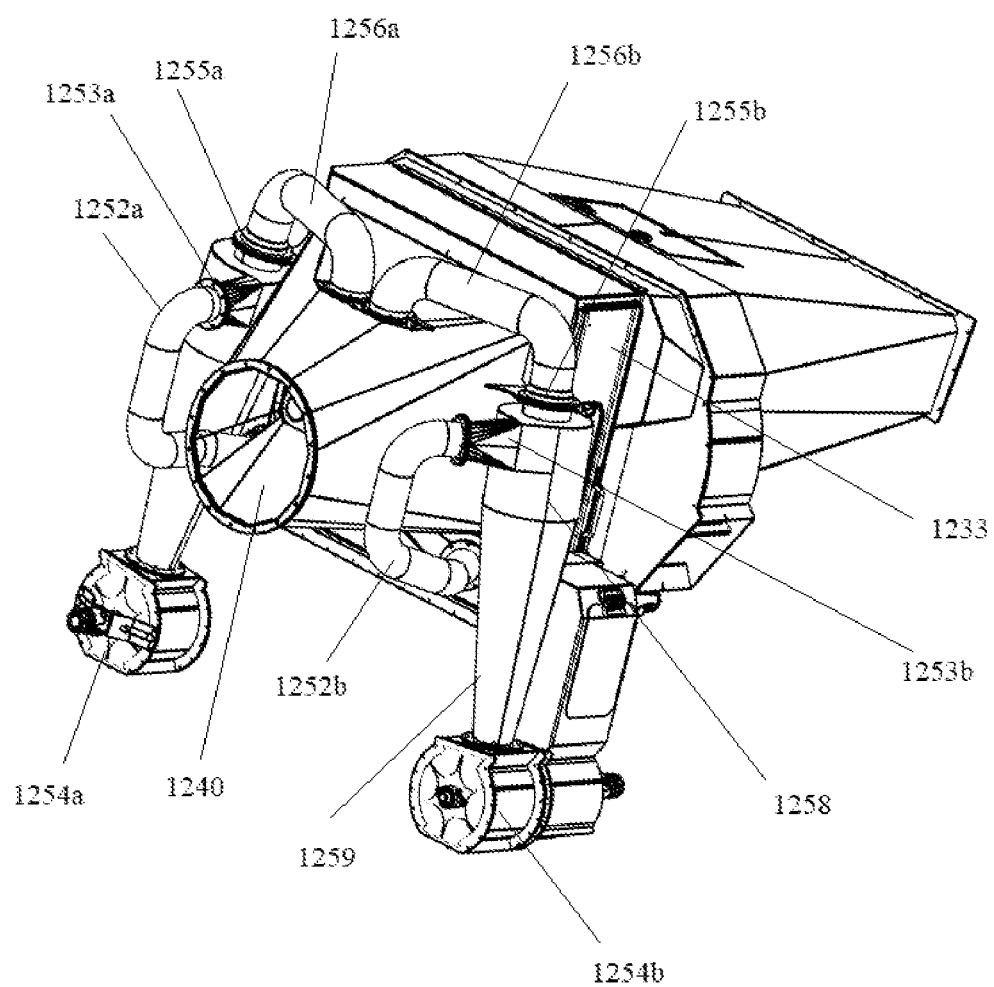
FIG. 10 provides a perspective view of a dust control system, according to an embodiment of the present invention.

In some embodiments, the dust control system may include a third filtering stage to supplement the second collection stage removal of fine particulate matter. FIGS. 8-10 show an exemplary embodiment of a dust control system 1300, which incorporates the same or similar components of the dust control system 1200, and adds a third filtering stage 1250. Some of the structures are omitted or shown as transparent in FIGS. 8-10 for illustrative purposes. The third filtering stage 1250 may scavenge the dirty air in central chamber of the separator rack 1233 and further process the captured dirty air to capture and remove additional particulate matter from the dirty airstream using cyclone separators 1251a and 1251b. The further clean air produced by the cyclone separators 1251a and 1251b is delivered into the second plenum 1240 for release into the ambient air. The third filtering stage 1250 may include collection ducts 1252a and 1252b that are in fluid communication with the central chamber 1233 of the separator rack 1232 to collect at least a portion of the dirty air within the central chamber 1233. The collection ducts 1252a and 1252b may be positioned at or near the bottom of the collection chamber 1233 to allow for the collection of particulates settling at the bottom of the central chamber 1233. The collection ducts 1252a and 1252b lead to influent ports 1253a and 1253b on the cyclone separators 1251a and 1251b, respectively.

Each of the cyclone separators 1251a and 1251b may include an upper cylindrical barrel 1258 and a lower cone 1259. The collection duct may deliver dirty air from the central chamber 1233 into the barrel 1258 through the influent port in a path that is tangential to the outer wall of the barrel 1258. The tangential delivery spiralizes the air flow around the perimeter of the barrel 1258, thus creating a vortex that results in the inertial forces of the particulate matter in the dirty air stream keeping the particulate matter on the perimeter of the barrel 1258. The dirty air stream travels downward through the barrel 1258 into the cone 1259. At the bottom of the cone 1259, the particulate matter discharges through a discharge port into an airlock (1254a, 1254b) and the clean air flows radially inwards and upward toward the top of the barrel 1258.

The cleaned air may exit the cyclone separators 1251a and 1251b through the clean air discharge ports 1255a and 1255b at the top of the barrels 1258. The clean air may then be collected by discharge conduits 1256a and 1256b that route the clean air to the second plenum 1240 to be mixed with the cleaned air from the separator rack 1233 and then discharged to the ambient air. The particulates that exit through the effluent duct at the distal end of the cyclone separators 1251a and 1251b may be collected by the rotary airlocks 1254a and 1254b and discharged from the dust control system 1300.

Figure 11A:
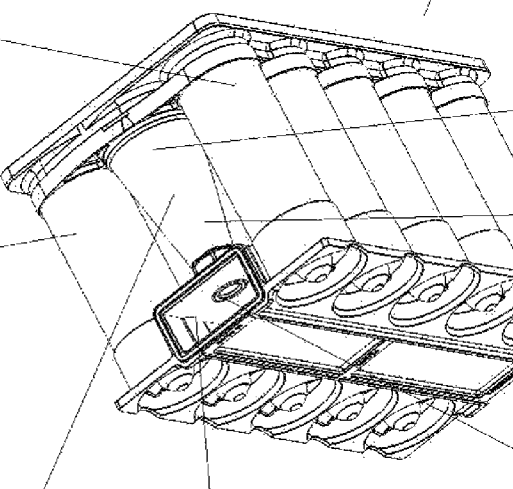
FIG. 11A-11B provides a perspective view of a separator rack of a dust control system, according to an embodiment of the present invention.
Figure 11B:
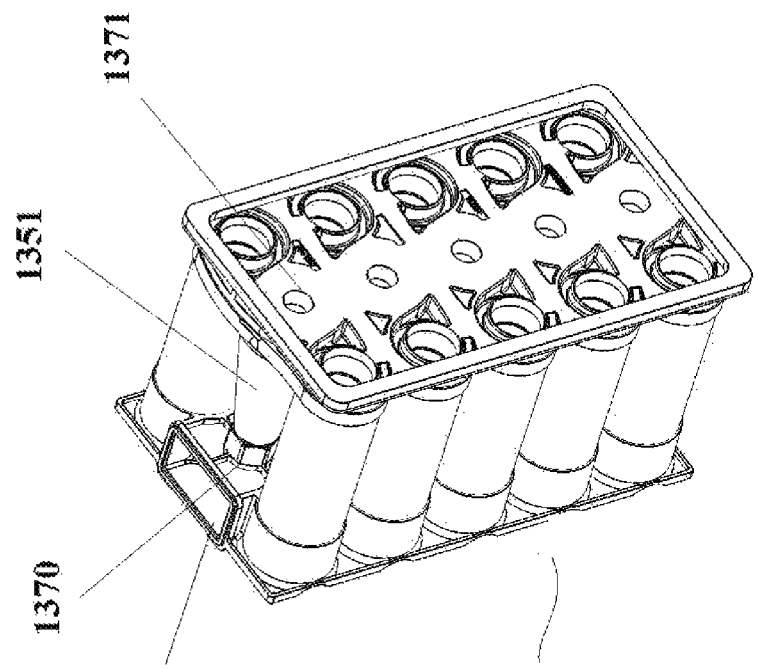
Figure 12:
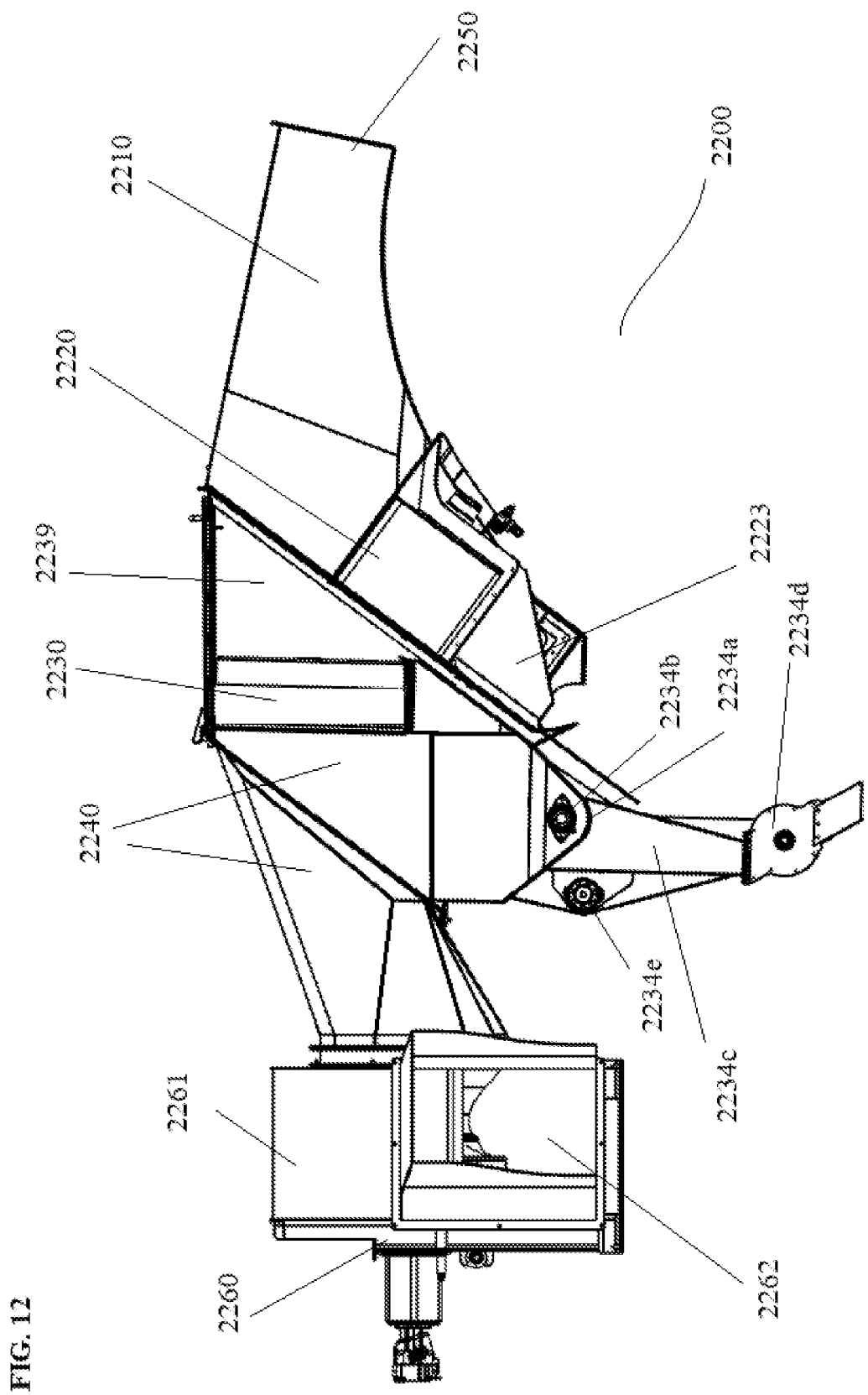
FIG. 12 provides a side elevation view of a dust control system, according to an embodiment of the present invention.
Figure 13:
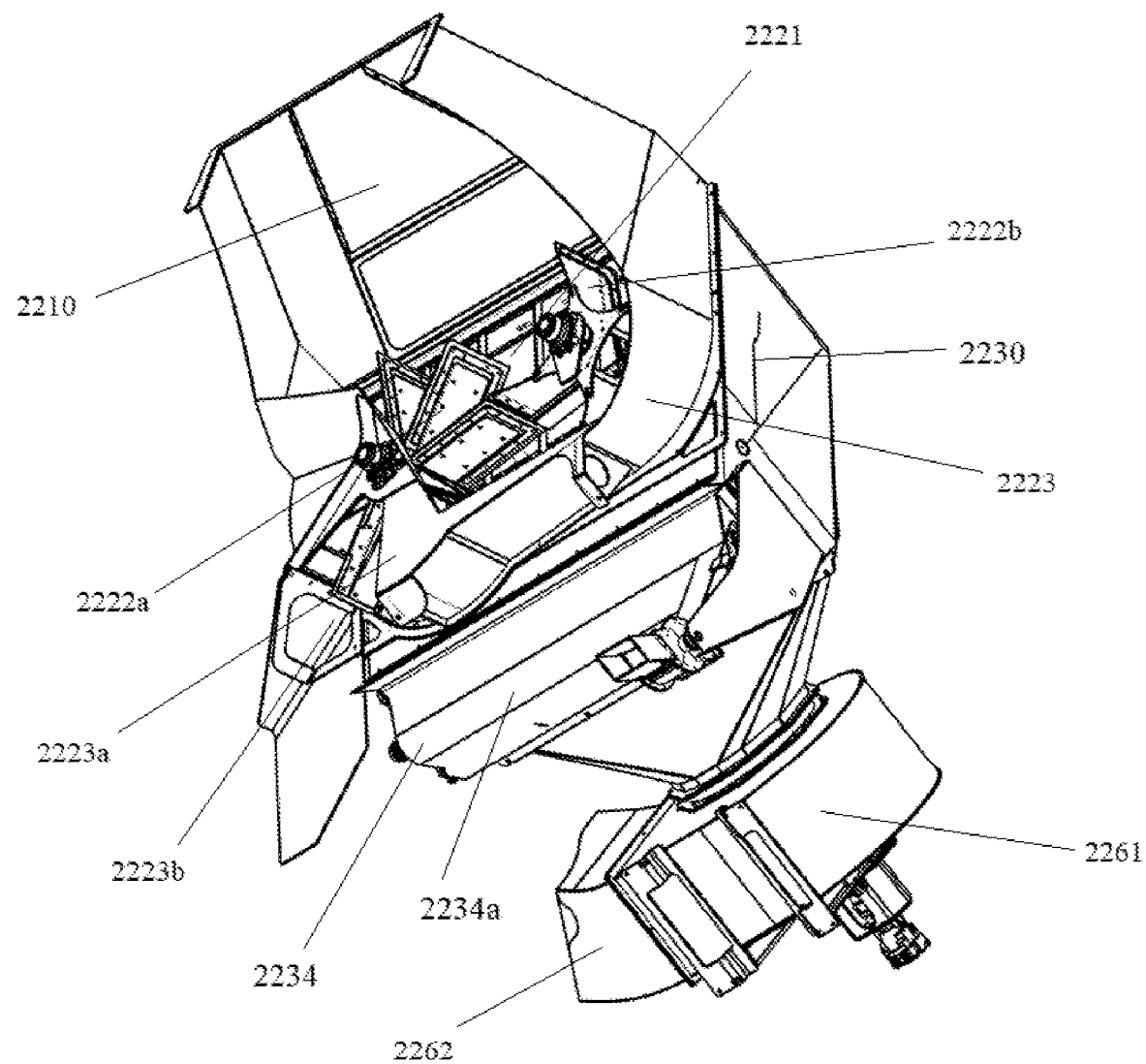
FIG. 13 provides a bottom perspective view of a dust control system, according to an embodiment of the present invention.

In a further embodiment, a dust control system may incorporate a third air filtration stage utilizing cyclone separators that are embedded in the separator rack. In some embodiments, the separator rack 1232 may include both vortex tube separators 1231 and cyclone separators 1351. FIGS. 11A-11B show a portion of an exemplary separator rack 1332 that incorporates both vortex tube separators 1231 and cyclone separators 1351. The vortex tube separators and cyclone separators may be arranged in various patterns, including 1:1 paired arrangements. In some embodiments, two vortex tube separators 1231a and 1231b and cyclone separator 1351 may be arranged in such that the two vortex tube separators 1231a and 1231b flank one central cyclone separator 1351, where the distal particulate collection pathway of the vortex tubes 1231a and 1231b may be in fluid communication with influent ports for the cyclone separator 1351. Such 2:1 units of vortex tubes and cyclone separators may be arranged in columns in the separator rack 1332, as shown in FIG. 11A-11B. The separator rack 1332 may include multiple columns of these units.

The airflow from the vortex tube separators 1231a and 1231b may feed into the cyclone separator 1351 in the same rotational direction to avoid turbulence and enhance the vortex effect in the cyclone separator 1351. In such embodiments, the cyclone separator 1351 acts as an additional filtration stage for removing particulates from the airstream. The particulate matter from the vortex tubes 1231a and 1231b may enter a barrel 1358 of cyclone separator 1351 through the influent ports in a pathway that is tangential to the outer perimeter of the barrel 1358. The particulate-laden airstream may then spiral around the barrel 1358 and through the narrowing cone 1359 of the cyclone separator 1351 toward a particulate discharge outlet 1370 that is in fluid communication with a collection conduit 1380 adjacent to the anterior wall of the separator rack 1332. The collection conduit 1380 may be in fluid communication with a plurality of cyclone separators 1351 and may lead inferiorly to an airlock for collection of the dust and debris separated by the cyclone separators 1351. Thus, the particulate matter is expelled from multiple cyclone separators 1351 into the collection conduit 1380, where it can be passed into an airlock (not shown). In some embodiments, a spiral conduit (not shown) may be positioned between the collection conduit 1380 to slow the airflow from the collection conduit 1380 before the dust and debris reaches the airlock. The separator rack 1332 may include several of the The clean air generated by the cyclone separator 1351 may pass through the opposite side of the separator rack into the second plenum through a clean air discharge port 1371. The vortex tube separators 1231 and the cyclone separators 1351 may be of about the same length and have similar outer diameters, such that the cyclone separators 1351 may be incorporated into the separator rack 1332 without significantly altering the relatively small volume of the separator rack 1332.

FIGS. 12-16C provide views of another embodiment of a dust control system 2200 that can be incorporated into the a harvester as described herein. The dust control system 2200 may be positioned over the collection conveyor 1060, cleaning conveyor 1070, and elevator conveyor 1080, such that it can draw dust and debris intermingled with the crop into the first plenum 2210. As in other embodiments, the crop material A may be retrieved from the ground by the rotating brush 1050 onto the collection conveyor 1060. The collection conveyor 1060 may deliver the collected crop material to the cleaning conveyor 1070, which may have a mesh or chain link belt that allows soil and debris smaller than the harvested fruit to fall to the ground. The cleaning conveyor 1070 may then deliver the partially cleaned crop A to the elevator conveyor 1080, which passes the crop A to the discharge chute 1090 to a container or other collection structure. The dust control system 2200 collects dust and debris remaining intermingled with the crop A from the elevator conveyor 1080 through a duct 2250 that sits over the elevator chain 1080.

Figure 14:
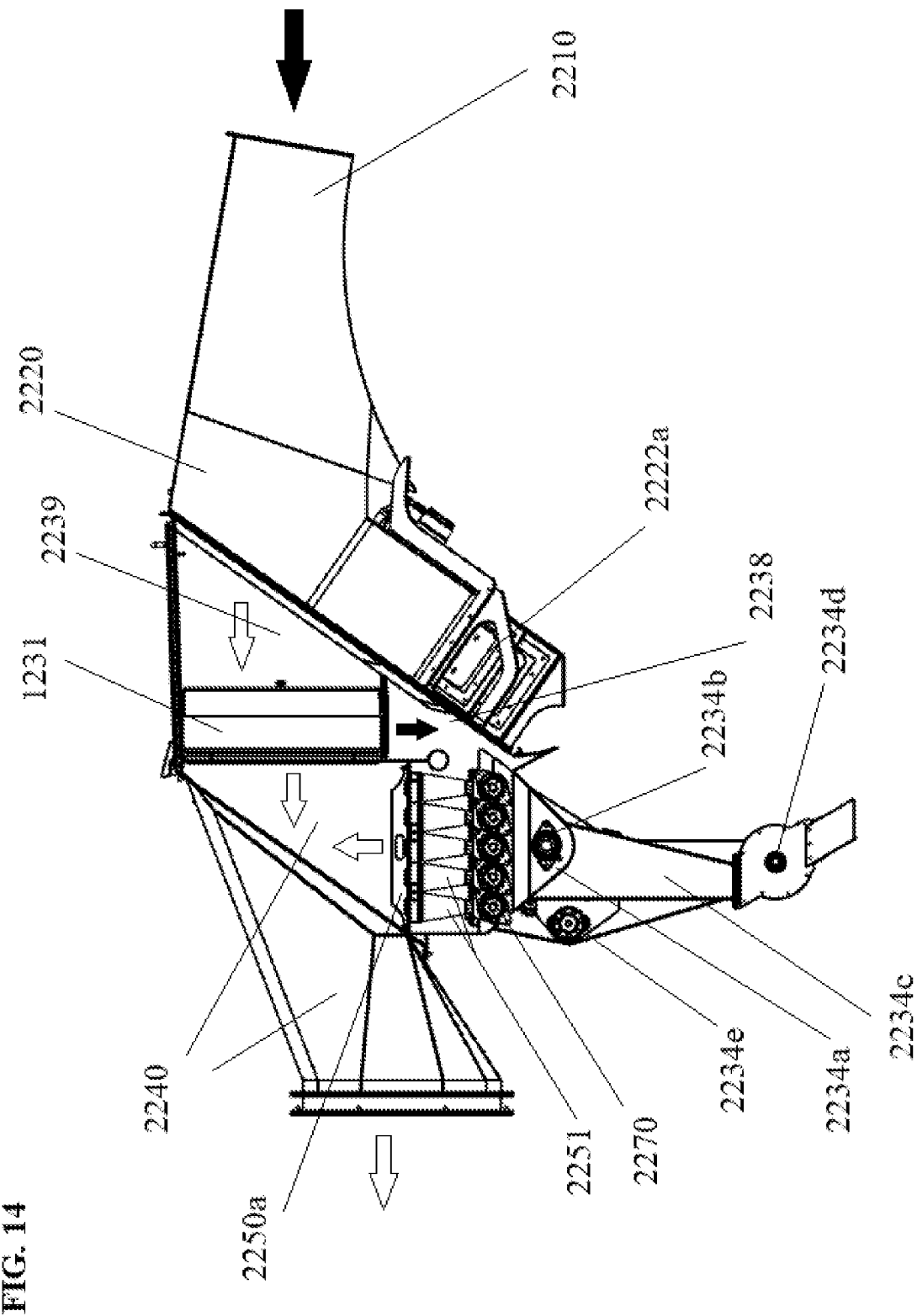
FIG. 14 provides a side elevation view of a dust control system, according to an embodiment of the present invention.
Figure 15:
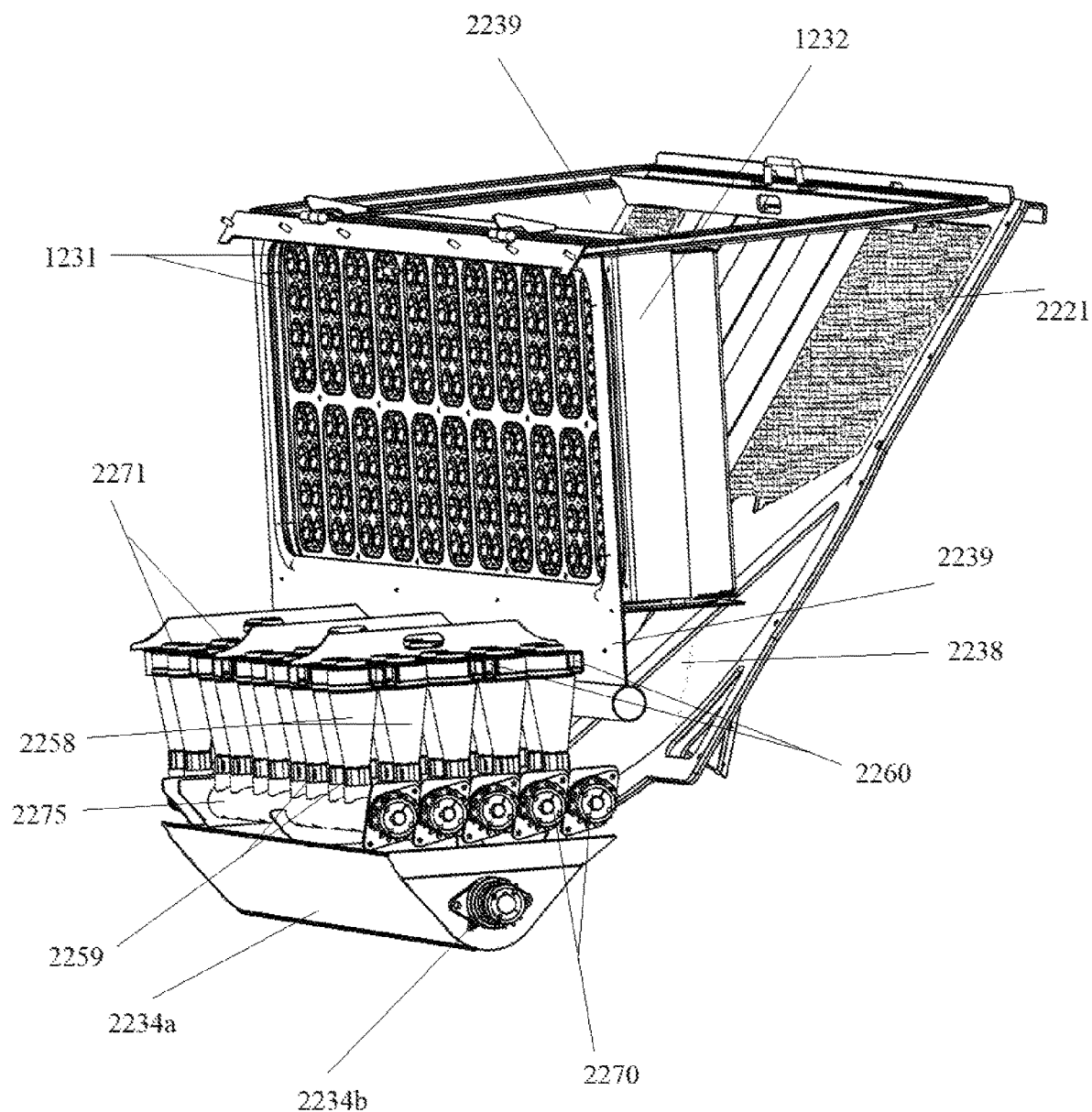
FIG. 15 provides an internal perspective view of a dust control system, according to an embodiment of the present invention.

The dust control system 2200 may include three filtering stages for the removal of fine particulate matter. The first filtering stage 2220 in which the walls of the first plenum 2210 are shown as transparent for illustrative purposes in FIG. 14. FIG. 14 also includes arrows showing the flow pattern of the airstream filtered by the dust control system 2200. The white arrows represent the direction of filtered airflow and the black arrows showing the flow of particulate-laden airflow. The first filtering stage 2220 may include a screen 2221 for capturing coarse dust and debris in the air stream that passes through the first plenum 2210, and a combination capture and cleaning mechanism operable to remove dust and debris from the upstream side of the screen 2221 and move the dust and debris into an airlock. The screen 2221 may be a static screen as as discussed with regard to FIG. 4A without any pathways or gaps around the screen, such that the airstream must pass through the screen to reach the later stages of the dust control system 2200. The screen 2221 may filter larger debris in the airstream such as leaves, twigs, and the like.

The combination capture and cleaning mechanism of the first filtering stage 2220 is shown in FIG. 14 from the bottom side of the exemplary dust control system 2200, with the walls of the first plenum 2210 presented as transparent for illustrative purposes. The mechanism includes two paddle wheels 2222*a* and 2222*b* that are bilaterally arranged at the upstream side of a screen 2221 such that their rotational axes are perpendicular to the surface of the screen 2221 and the lateral edges of the blades of the paddle wheels abut the upstream surface of the screen 2221. The blades may be semi-flexible and pass over the screen 2221 with sufficient pressure to dislodge and collect dust and debris collected thereon.

Each of paddle wheels 2222*a* and 2222*b* are within the walls of the first plenum 2210 and partially enclosed in a housing 2223, which allows dust and debris captured by the paddle wheels to be separated from the first plenum 2210 to prevent re-entrainment. The paddle wheel 2222*a* may be partially nested within an airlock housing 2223*a*, located within housing 2223. For illustrative purposes, the proximal wall of the housing 2223 and part of the proximal wall of the airlock housing 2223*a* are presented as transparent in FIG. 13. The airlock housing 2223*a* may be shaped such that the blades of the paddle wheel 2222*a* may rotate and pass through the airlock housing 2223*a* while maintaining a substantially airtight seal to prevent the escape of dust and debris and maintain an air seal between the first plenum 2210 and the airlock.

The paddle wheels 2222*a* and 2222*b* may rotate continuously during operation of the harvester, so as to avoid the accumulation of dust and debris on the screen 2221. The paddle wheels 2222*a* and 2222*b* pass the collected dust and debris into the airlock housing 2223*a*. The paddle wheels 2222*a* and 2222*b* may have overlapping rotational paths at the center of the screen 2221 to aid in the transfer of dust and debris to the paddle wheel 2222*a*. The paddle wheels may rotate to direct dust and debris it collects from the screen toward the paddle wheel 2222*a* from the base of the paddle wheel 2222*b*. The airlock housing 2223*a* may be contiguous and in fluid communication with an airlock discharge duct 2223*b* for discharge of the collected debris to the exterior of the dust control system 2200. The discharge duct 2223*b* may be below paddle wheel 2222*a* to allow the dust and debris falling from the paddle wheel 2222*a* to be collected. In some implementations, the screen wiping mechanism may alternatively include a cycling belt having wiper blade structures positioned at intervals along the cycling belt and that contact the upstream, proximal surface of the screen, as shown in FIG. 4A. The cycling belt assembly shown in and described with respect to FIG. 4A may be substituted into the dust control system 2200 for the paddle wheel system.

A second filtering stage 2230 may include a plurality of vortex tube separators 1231 operable to remove the finer dust and particles from the partially filtered airstream received from the first filtering stage 2220. The partially filtered airstream from the first filtering stage 2220 enters a second plenum 2239, and is then forced through the vortex tube separators 1231 as there is no other available path through the second plenum 2239, which is sealed except for the proximal ends of the vortex tube separators 1231. The vortex tube separators 1231 may be arranged and incorporated into a substantially airtight separator rack 1232, as shown in and described above with respect to FIG. 7, and each vortex tube separator 1231 may be structured as described above with respect to FIGS. 6A-6C. The air in the second plenum may enter the vortex tube separators 1231 through the proximal ends thereof. The proximal ends of the vortex tubes may be embedded in a airtight manner in an anterior wall of the separator rack 1232. The air cleaned by the vortex tubes 1231 may pass through distal central collection cones 1231*e* embedded in the posterior wall of the separator rack 1232 with a substantial airtight seal between perimeter of the distal end of the vortex tube 1231 and the distal wall. The air may be expelled through the distal cone 1231*e* of the vortex tube into third plenum 2240.

The separator rack 1232 may include a central chamber 1233 into which the particulate material separated by the vortex tube separators 1231 is passed. The perimeter spiral collection pathway 1231*f* of each vortex tube separate 1231 may collect the particulate matter that is spun to the outer perimeter of the body 1231*d* of the vortex tube separator 1231. There may be circumferential gap between the outer perimeter of the body 1231*d* and the central collection cone 1231*e* through which the particulate matter may pass into the central chamber 1233. The central chamber 1233 may be in fluid communication with a particulate collection passage 2238 into which the collected particulates are routed. The particulate collection passage 2238 may be in fluid communication with a dust collection assembly 2234 for collecting and sequestering the particulate material. Greater than about 95 wt % (e.g., greater than about 97 wt %, about 95 wt % to about 99 wt %, about 97% to about 99%, etc.) of the particulate material in the airstream taken into the dust control system 2200 is retained in the scavenged air flow from the separator rack 2230 that is passed into the particulate collection passage 2238, providing a high efficiency removal of particulate matter from the air stream expelled through the vortex separator tubes 1231 into the third plenum 2240. The portion of the airflow that passing through the vortex separator tubes 1231 and into the third plenum 2240 may be in the range of 75% to 90% of the total volume of air taken into the dust control system 2200. The remaining volume of air carries the greater than about 95 wt % of the particulate matter into the particulate collection passage 2238.

Some of the particulate matter in the air flow through the particulate collection passage 2238 may settle out in trough 2234a. The particulate collection passage 2238 may also be in fluid communication with a third filtering stage 2250 for scavenging the dirty air present in the particulate collection passage 2238 and further process the dirty air to capture and remove additional particulate matter from the dirty airstream using a second separator rack 2250a that includes an array of cyclone separators 2251. The particulate collection passage 2238 may include a flow barrier 2239 around which particulate-laden air is routed to an area in which the second separator rack 2250a is located.

FIGS. 16A-16C show the structures of the second separator rack 2250a. The second separator rack 2250a may have several rows of cyclone separators 2251 arranged in a grid pattern. The distal ends of the cyclone separators 2251 may be connected by airtight seal to an upper rack plate 2255. The airtight seal results in the movement of the airflow from the particulate collection passage 2238 through the cyclone separators 2251 via their influent ports 2260. The particulate-laden air passes through the cyclone separators 2251, as there may be no other available path through the particulate collection passage 2238, which is sealed except for the influent port 2260.

The particulate matter from the particulate collection passage 2238 may enter a barrel 2258 of each cyclone separator 2251 through the influent port 2260 in a pathway that is tangential to the outer perimeter of the barrel 2258. The particulate-laden airstream may then spiral around the barrel 2258 and through a narrowing cone 2259 of the cyclone separator 2251 toward a rotary airlock 2270 that receives the particulate material from the inferior end of the cyclone separator 2251 and prevents re-entrainment of the particulate material. Each of the cyclone separators may be connected to one of a plurality of rotary airlocks 2270 that utilize augurs or other rotary mechanism to trap the particulate material in a channel 2275, each of which may be in fluid communication with a particulate collection assembly 2234. Each row of cyclone separators 2251 may be connected to an airlock channel 2275. The airlock channels 2275 are shown as transparent in FIG. 16A to illustrate the interior of the airlocks 2270. The augur may move the particulate material from the airlock 2270 toward a distal end of the channel 2275 to deposit the particulate material in the trough 2234a, where it can be collected and expelled from the dust control system 2200.

The particulate collection assembly 2234 may include an augur or other structure 2234b for moving the particulate material in the trough 2234a toward a collection shaft 2234c and into an discharge airlock 2234d that expels the particulate matter from the dust control system 2200. The dust control system 2200 may include one or more motors for driving the rotation of rotatory airlocks 2270 and 2234d, and augur 2234b, which may be in mechanical connection therewith through one or more gears, sprockets, belts, chains, or other connectors. For example, the dust control system 2200 may include an motor 2234e (e.g., an electric motor, such as a DC rotary electric motor, stepper motor, etc.). The particulate collection assembly 2234 allows the particulate matter to be simply released from the discharge airlock 2234d, dropping it to the ground, as the augur 2234b and airlock 2234d provides a barrier against high air pressures that might cause spreading or suspension of the particulates in the air. Instead the particulates are simply dropped to the ground from a short distance. The discharge airlock may be no more distant from the ground than about 6 inches to about 24 inches.

The further clean air produced by the cyclone separators 2251 is delivered into the third plenum 2240 for release into the ambient air. The cyclone separators 2251 act as an additional filtration stage for removing particulates from the airstream. About 35 wt % to about 65 wt % (e.g., about 45 wt % to about 55 wt %) of the particulates in the airstream in the particulate collection passage 2238 settle out of the air stream into the trough 2234a. Greater than about 95 wt % (e.g., greater than about 97 wt %, about 95 wt % to about 99 wt %, about 97 wt % to about 99%, etc.) of the remaining particulates may be removed from the airstream by the second separator rack 2250a. The clean air generated by the cyclone separators 2251 may pass through clean air discharge outlets 2271 of the cyclone separators 2251 into the third plenum 2240 to be mixed with the cleaned air from the separator rack 1230 and then discharged to the ambient air. The dust control system 2200 provides a great improvement in particulate removal efficiency relative to conventional system, allow a harvester to operate without the use of honerous devices, e.g., that use water to capture dust or that must collect and store the dust, requiring frequent interruptions in operation to empty a collection vessel.

The third plenum 2240 is in fluid communication with a discharge duct 2262 through which the cleaned air may be released from the dust control system 2200 into the ambient air without significant amounts of dust or particulate matter. The cleaned airstream may be routed through a fan chamber 2261 by the suction created by the fan 2260 and then through the discharge duct 2262.

CONCLUSION/SUMMARY

The present invention provides improved dust control systems that are able to remove small particulate matter from fouled air generated through agricultural harvesting practices. The present system is able to remove fine particulate matter from fouled air without the use of water or electrostatic mechanism. It is to be understood that variations, modifications, and permutations of embodiments of the present invention, and uses thereof, may be made without departing from the scope of the invention. It is also to be understood that the present invention is not limited by the specific embodiments, descriptions, or illustrations or combinations of either components or steps disclosed herein. The embodiments were chosen and described in order to best explain the principles of the invention and its practical application, to thereby enable others skilled in the art to best utilize the invention and various embodiments with various modifications as are suited to the particular use contemplated. Although reference has been made to the accompanying figures, it is to be appreciated that these figures are exemplary and are not meant to limit the scope of the invention. It is intended that the scope of the invention be defined by the claims appended hereto and their equivalents.

The invention claimed is:

1. A crop harvester having a dust control system for removing debris and fine particulates form an airstream, comprising:
   a. a crop collection assembly operable to retrieve a crop from the ground;
   b. a crop conveying system;
   c. an air-moving device for reducing air pressure within the dust control system to create an airstream through said dust control system;
   d. a first air filtering stage comprising i. a screen for preventing passage of debris of a pre-determined size, and
ii. a rotating cleaning device operable to continuously remove dust and debris from said screen and pass said dust and debris into an airlock chamber;
e. a second air filtering stage downstream of said first air filtering stage operable to remove fine particulates from said airstream, said second air filtering stage comprising a plurality of vortex tube separators; and
f. a third air filtering stage downstream of said second air filtering stage, said third filtering stage including at least one cyclone separator.

2. The system of claim 1, wherein each of said plurality of vortex tube separators includes
  a. a proximal section for receiving particulate-laden air from said first air filtering stage that includes central deflection cone, angled blades positioned between an axial center of the vortex tube and a perimeter of the vortex tube,
  b. a body in which the particulates are concentrated along the circumference of the body by a vortex generated by said angled blades, and
  c. a distal section having a clean air collection duct for collecting clean air from the central area of the body, and a perimeter collection duct for collecting particulate material from the perimeter of the body for delivery to the central chamber.

3. The system of claim 2, wherein said plurality of vortex tube separators are arranged in a vortex tube housing having a central chamber operable to receive particulate matter from each of said vortex tube separators through the perimeter collection duct.

4. The system of claim 3, wherein clean air is passes through a distal clean air collection duct into a plenum distal to said vortex tube housing.

5. The system of claim 1, further comprising a third air filtering stage, said third filtering stage including at least one cyclone separator.

6. The system of claim 1, wherein said cyclone separator is operable to remove fine particulate matter from dirty air received from said central chamber by concentrating said particulate matter along the circumference of the cyclone separator by a vortex generated within the cyclone separator.

7. A crop harvesting machine, comprising:
  a. a crop collection assembly operable to retrieve a crop from the ground;
  b. a conveying system; and
  c. a dust control system including
    i. a air-moving device for reducing air pressure within the dust control system to create an airstream through said dust control system;
    ii. a duct for collecting said airstream along with debris and fine particulates;
    iii. a first air filtering stage comprising
      1. a screen for preventing passage of debris of a pre-determined size, and
      2. a rotating cleaning device operable to continuously remove dust and debris from said screen and pass said dust and debris into an airlock chamber; and
    iv. a second air filtering stage downstream of said first air filtering stage operable to remove fine particulates from said airstream, said second air filtering stage comprising a plurality of vortex tube separators; and
    v. a third air filtering stage downstream of said second air filtering stage, said third filtering stage including at least one cyclone separator.

8. The machine of claim 7, wherein each of said plurality of vortex tube separators includes
  a. a proximal section for receiving particulate-laden air from said first air filtering stage that includes central deflection cone, angled blades positioned between an axial center of the vortex tube and a perimeter of the vortex tube,
  b. a body in which the particulates are concentrated along the circumference of the body by a vortex generated by said angled blades, and
  c. a distal section having a clean air collection duct for collecting clean air from the central area of the body, and a perimeter collection duct for collecting particulate material from the perimeter of the body for delivery to the central chamber.

9. The machine of claim 8, wherein said plurality of vortex tube separators are arranged in a vortex tube housing having a central chamber operable to receive particulate matter from each of said vortex tube separators through the perimeter collection duct.

10. The machine of claim 9, wherein clean air is passes through a distal clean air collection duct into a plenum distal to said vortex tube housing.

11. The machine of claim 7, further comprising a third air filtering stage, said third filtering stage including at least one cyclone separator.

12. The machine of claim 7, wherein said cyclone separator is operable to remove fine particulate matter from dirty air received from said central chamber by concentrating said particulate matter along the circumference of the cyclone separator by a vortex generated within the cyclone separator.

13. A crop harvester having a dust control system for removing debris and fine particulates form an airstream, comprising:
  a. a crop collection assembly operable to retrieve a crop from the ground;
  b. a crop conveying system;
  c. a mechanism for reducing air pressure within the dust control system to create an airstream through said dust control system;
  d. a first air filtering stage comprising a screen for preventing passage of debris of a pre-determined size and a rotating cleaning device operable to continuously remove dust and debris from said screen;
  e. a vortex tube air filtering stage downstream of said first air filtering stage operable to remove fine particulates from said airstream, said second air filtering stage comprising a plurality of vortex tube separators; and
  f. a cyclone separator air filtering stage downstream of said vortex tube air filtering stage comprising at least one cyclone separator, said cyclone separator air filtering stage being operable to receive a scavenged particulate-laden air from said plurality of vortex tube separators.

14. The system of claim 13, wherein each of said plurality of vortex tube separators includes
  a. a proximal section for receiving particulate-laden air from said first air filtering stage that includes central deflection cone, angled blades positioned between an axial center of the vortex tube and a perimeter of the vortex tube,
  b. a body in which the particulates are concentrated along the circumference of the body by a vortex generated by said angled blades, and
  c. a distal section having a clean air collection duct for collecting clean air from the central area of the body, and a perimeter collection duct for collecting particulate material from the perimeter of the body for delivery to the central chamber.

15. The system of claim 14, wherein said plurality of vortex tube separators are arranged in a vortex tube housing having a central chamber operable to receive said scavenged particulate-laden air from each of said vortex tube separators through the perimeter collection duct.

16. The system of claim 15, wherein a cleaned airstream is passed through a distal clean air collection duct into a plenum distal to said vortex tube housing.

17. The system of claim 15, wherein said cyclone separator air filtering stage receives said scavenged particulate-laden air and is operable to remove fine particulate matter from said scavenged particulate-laden air by concentrating said particulate matter along the circumference of at least one cyclone separator by a vortex generated within the at least one cyclone separator.

* * * * *